(12) United States Patent
Omar et al.

(10) Patent No.: US 12,491,307 B2
(45) Date of Patent: Dec. 9, 2025

(54) SYSTEMS AND METHODS FACILITATING SURGICAL FLUID MANAGEMENT

(71) Applicant: Medtronic Xomed, LLC, Jacksonville, FL (US)

(72) Inventors: Mansur I. Omar, Jacksonville, FL (US); Murali K. Marisetti, Hyderabad (IN); Manjit S. Bindra, Hyderabad (IN)

(73) Assignee: Medtronic Xomed, LLC, Jacksonville, FL (US)

(*) Notice: Subject to any disclaimer, the term of this patent is extended or adjusted under 35 U.S.C. 154(b) by 278 days.

(21) Appl. No.: 18/131,664

(22) Filed: Apr. 6, 2023

(65) Prior Publication Data

US 2023/0364323 A1 Nov. 16, 2023

Related U.S. Application Data

(60) Provisional application No. 63/420,382, filed on Oct. 28, 2022, provisional application No. 63/341,042, filed on May 12, 2022.

(51) Int. Cl.
*A61M 1/00* (2006.01)
*A61M 3/02* (2006.01)

(52) U.S. Cl.
CPC .............. *A61M 1/72* (2021.05); *A61M 1/77* (2021.05); *A61M 3/0201* (2021.05);
(Continued)

(58) Field of Classification Search
CPC ........ A61M 1/72; A61M 1/77; A61M 3/0201; A61M 2205/12; A61M 2205/3569;
(Continued)

(56) References Cited

U.S. PATENT DOCUMENTS

| 4,850,377 A | 7/1989 | Parker et al. |
| 5,246,422 A | 9/1993 | Favre |

(Continued)

FOREIGN PATENT DOCUMENTS

| EP | 0682952 A1 | 11/1995 |
| EP | 0776670 B1 | 9/2001 |

(Continued)

OTHER PUBLICATIONS

Extended European Search Report EP23172229.9 dated Jan. 17, 2024, 15pp.

(Continued)

*Primary Examiner* — Wesley G Harris
(74) *Attorney, Agent, or Firm* — Carter, DeLuca & Farrell LLP

(57) ABSTRACT

A surgical fluid management system includes a console defining a cassette bay and a cassette, including a fluid line extending therethrough, configured for insertion into the cassette bay of the console. The console includes a sensor disposed adjacent the cassette bay configured to detect a position of the cassette relative to the cassette bay to enable selective locking or unlocking of the cassette within the cassette bay. Additionally or alternatively, the console includes cassette bay electronics configured to obtain encoded information from the cassette.

11 Claims, 12 Drawing Sheets

(52) U.S. Cl.
CPC ........ *A61M 3/0202* (2021.05); *A61M 3/0258* (2013.01); *A61M 2205/121* (2013.01); *A61M 2205/3306* (2013.01); *A61M 2205/3569* (2013.01); *A61M 2205/3576* (2013.01); *A61M 2205/60* (2013.01); *A61M 2205/6054* (2013.01); *A61M 2205/6063* (2013.01)

(58) Field of Classification Search
CPC ........ A61M 2205/3331; A61M 3/0202; A61M 3/0258; A61M 2205/121; A61M 2205/3306; A61M 2205/3576; A61M 2205/60; A61M 2205/6063; A61M 1/152; A61M 1/1522; A61M 1/1524; A61M 1/153; A61M 1/154; A61M 1/155; A61M 1/156; A61M 1/1561; A61M 1/1562; A61M 1/15625; A61M 1/15–159
See application file for complete search history.

(56) References Cited

U.S. PATENT DOCUMENTS

| | | | |
|---|---|---|---|
| 8,852,085 | B2 | 10/2014 | Shener-Irmakoglu et al. |
| 9,770,541 | B2 | 9/2017 | Carr et al. |
| 2005/0118048 | A1 | 6/2005 | Traxinger |
| 2006/0073048 | A1 | 4/2006 | Malackowski |
| 2007/0107490 | A1* | 5/2007 | Artsyukhovich ....... A61M 1/77 73/1.16 |
| 2008/0097284 | A1 | 4/2008 | Gao et al. |
| 2010/0249693 | A1* | 9/2010 | Links ...................... A61M 1/72 604/22 |
| 2011/0112472 | A1* | 5/2011 | Jacobson ............ A61F 9/00736 604/67 |
| 2011/0286008 | A1* | 11/2011 | Schlaeppi ........... A61M 5/1456 356/614 |
| 2013/0267892 | A1* | 10/2013 | Woolford ........... A61B 17/1659 604/319 |
| 2016/0287779 | A1* | 10/2016 | Orczy-Timko ..... A61M 3/0202 |
| 2017/0224429 | A1* | 8/2017 | Fung ...................... A61B 90/08 |
| 2018/0306613 | A1* | 10/2018 | Ciou ........................ A61D 7/00 |
| 2019/0201136 | A1* | 7/2019 | Shelton, IV ........... A61B 1/051 |

FOREIGN PATENT DOCUMENTS

| | | |
|---|---|---|
| EP | 1839690 A1 | 10/2007 |
| EP | 1787606 B1 | 8/2008 |
| WO | 2021124144 A1 | 6/2021 |

OTHER PUBLICATIONS

Partial European Search Report issued in corresponding European Application No. 23172229.9 dated Oct. 10, 2023, 14 pages.

* cited by examiner

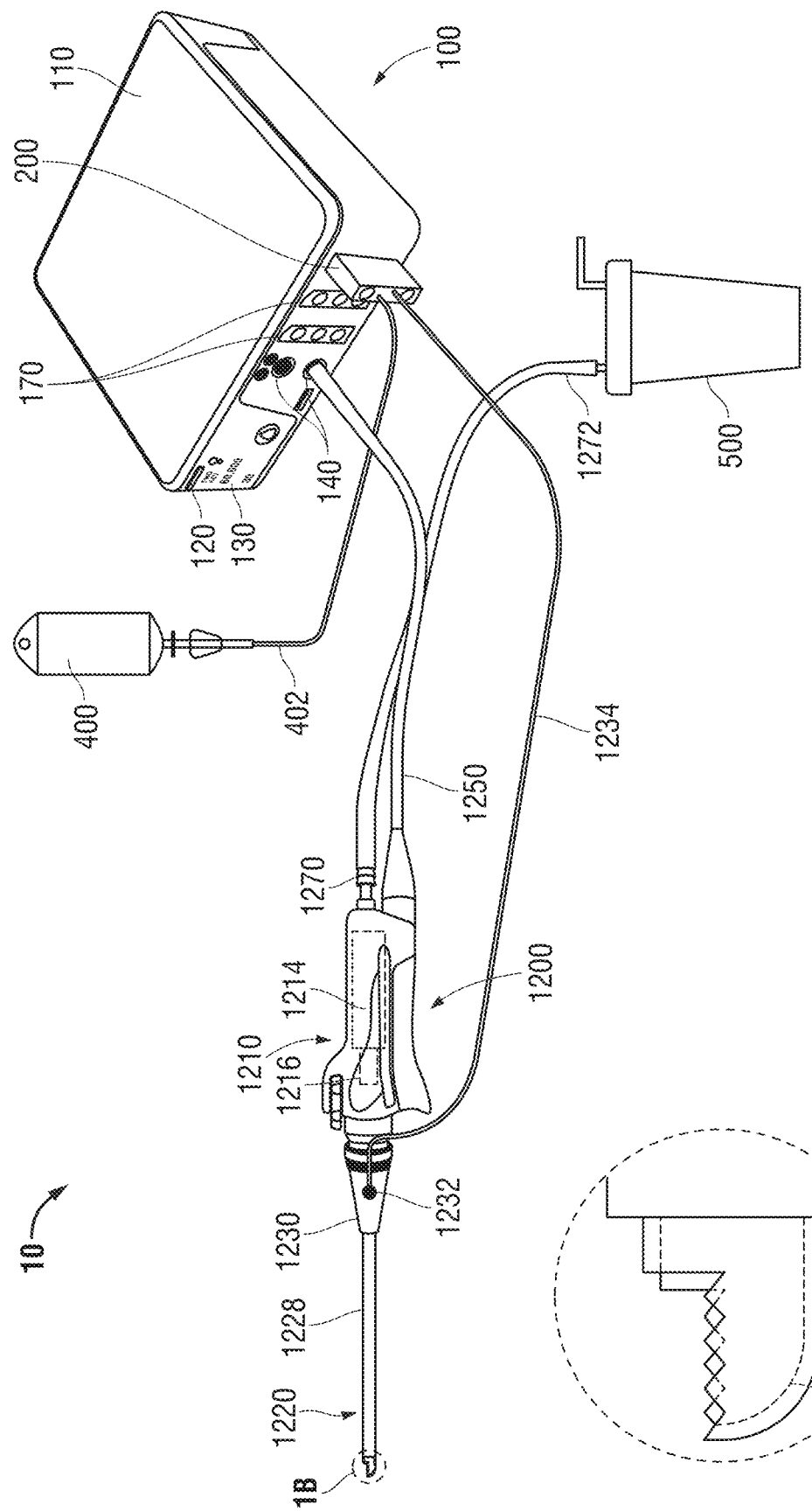
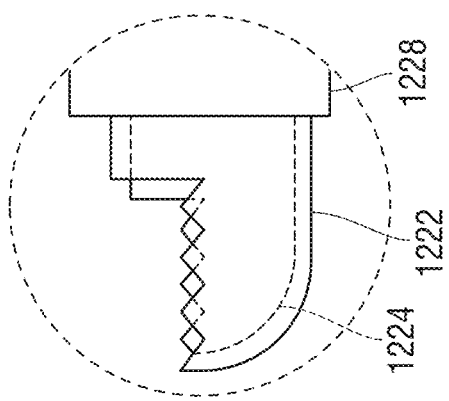
FIG. 1A
FIG. 1B

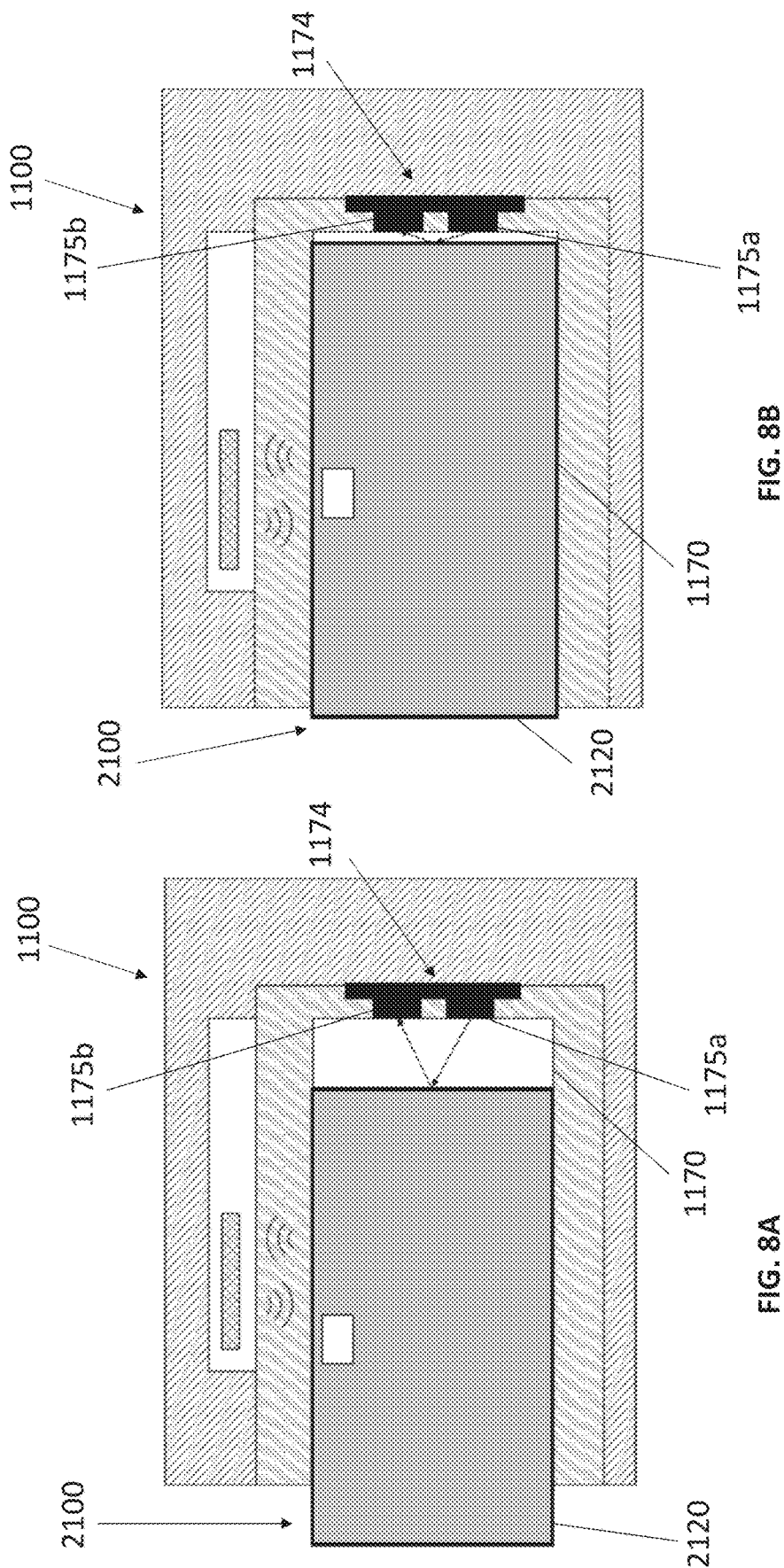

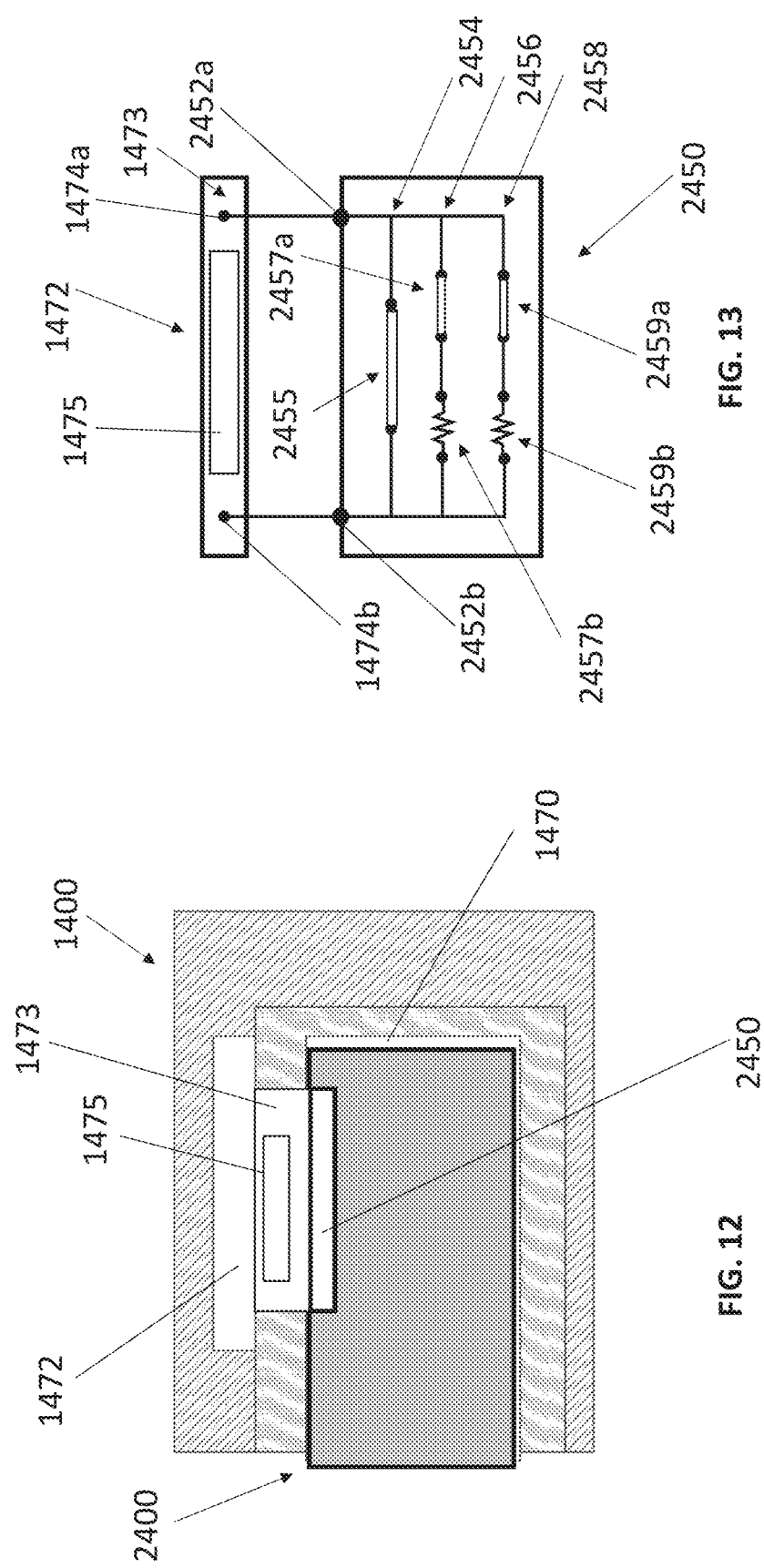

SYSTEMS AND METHODS FACILITATING SURGICAL FLUID MANAGEMENT

CROSS-REFERENCE TO RELATED APPLICATIONS

This application claims the benefit of, and priority to, U.S. Provisional Application No. 63/341,042, filed on May 12, 2022, and U.S. Provisional Application No. 63/420,382, filed on Oct. 28, 2022, the entire contents of each of which is hereby incorporated herein by reference.

FIELD

The present disclosure relates to systems and methods facilitating surgical fluid management.

BACKGROUND

Fluid is utilized in conjunction with many surgical devices, systems, and methods to facilitate performing a surgical task such as, for example, enabling irrigation at a treatment site, aspiration at a treatment site, cleaning of a surgical device, washing of a treatment site, clearing a field of view, cooling a surgical device, etc. Some non-limiting examples of surgical devices that benefit from the use of fluid include microdebriders, surgical drills, surgical saws, suction irrigators, tissue shavers, endoscopes, balloon or other catheters, energy devices, and the like.

Surgical systems enabling the use of fluid typically include a fluid management console connected to a surgical device. The fluid management console may further connect to a fluid source and/or fluid collection canister and incorporate a pump to enable control of the flow of fluid to the surgical site via the surgical device and/or from the surgical site via the surgical device or a separate outflow path.

SUMMARY

The terms "about," substantially," and the like, as utilized herein, are meant to account for manufacturing, material, environmental, use, and/or measurement tolerances and variations, and in any event may encompass differences of up to 10%. Further, to the extent consistent, any of the aspects described herein may be used in conjunction with any or all of the other aspects described herein.

Provided in accordance with aspects of the present disclosure is a surgical fluid management system including a console and a cassette. The console defines a cassette bay and includes a sensor disposed adjacent the cassette bay and an actuator disposed adjacent the cassette bay. The cassette includes at least one fluid line extending therethrough. The at least one fluid line may include an irrigation or other fluid supply line, and/or may include a vacuum fluid line. In aspects, one of the at least one fluid lines is a bifurcated fluid lines that splits a single channel into two separate channels. The cassette is configured for insertion into the cassette bay, in an insertion direction, to an operational position. The console is configured to lock the cassette in the operational position. The sensor is configured to detect movement of the cassette from the operational position, farther in the insertion direction, to a release position. The console is configured to unlock the cassette in response to the sensor detecting movement of the cassette to the release position, thereby enabling withdrawal of the cassette from the console.

In an aspect of the present disclosure, the console is configured to move the actuator from a retracted position to a home position to lock the cassette and to move the actuator from the home position to the retracted position to unlock the cassette.

In another aspect of the present disclosure, the actuator is configured to selectively open or close the fluid line of the cassette.

In still another aspect of the present disclosure, the actuator is driven by a solenoid within the console. In aspects where multiple lines are provided, multiple solenoids may be provided.

In another aspect of the present disclosure, the sensor is an optical sensor.

In yet another aspect of the present disclosure, the cassette includes a reflector and the optical sensor includes an emitter and a detector disposed adjacent one another. In such aspects, in the operational position of the cassette, the reflector is positioned to reflect electromagnetic radiation from the emitter to the detector. In the release position of the cassette, the reflector is offset such that the electromagnetic radiation from the emitter is not reflected to the detector. In such aspects, an absorber may be disposed adjacent (on either or both sides) of the reflector so as to at least partially absorb the electromagnetic radiation, thereby inhibiting or reducing reflection. In aspects, the cassette is formed at least partially from such an absorber material.

In still yet another aspect of the present disclosure, the cassette includes an extension defining an aperture and the optical sensor includes an emitter and a detector disposed on opposing sides of a channel. In such aspects, in the operational position of the cassette, the extension is positioned within the channel such that the aperture is aligned between the emitter and the detector to permit transmission of electromagnetic radiation from the emitter to the detector. In the release position of the cassette, the aperture is misaligned such that the electromagnetic radiation from the emitter is blocked by the extension and not transmitted to the detector.

In another aspect of the present disclosure, the console further includes a wireless antenna and the cassette further includes a data tag. The wireless antenna is configured to wirelessly access data stored on the data tag when the cassette is at least partially inserted into the cassette bay of the console. In such aspects, the data tag may store identifying information and/or use information associated with the cassette.

In still another aspect of the present disclosure, the sensor is further configured to detect insertion of the cassette into the cassette bay to the operational position. In such aspects, the console is configured to lock the cassette in the operational position in response to the sensor detecting insertion of the cassette into the cassette bay to the operational position.

A method of surgical fluid management provided in accordance with aspects of the present disclosure includes: receiving a cassette, inserted in an insertion direction, within a cassette bay of a console; locking the cassette within the cassette bay of the console in an operational position; operating at least one actuator of the console to control fluid flow through at least one fluid path (an inflow, e.g., irrigation and/or outflow, e.g., vacuum, fluid path) defined within the cassette; detecting movement of the cassette from the operational position to a release position, the release position farther within the cassette bay in the insertion direction as compared to the operational position; and unlocking the cassette from the cassette bay of the console.

In an aspect of the present disclosure, locking the cassette within the cassette bay includes advancing the actuator from a retracted position to a home position.

In another aspect of the present disclosure, unlocking the cassette from the cassette bay includes retracting the actuator from the home position to the retracted position.

In yet another aspect of the present disclosure, operating the actuator(s) includes moving the actuator(s) to selectively open or close the fluid path(s).

In still another aspect of the present disclosure, detecting movement of the cassette includes detecting, at a detector, the presence or absence of electromagnetic radiation. In such aspects, detecting movement of the cassette may more specifically include detecting, at the detector, the absence of electromagnetic radiation emitted from an emitter and reflected off of the cassette. Alternatively, detecting movement of the cassette may more specifically include detecting, at the detector, the absence of electromagnetic radiation emitted from an emitter and passing through an aperture defined within the cassette.

In still yet another aspect of the present disclosure, the method further includes accessing, by the console, data stored within a data tag associated with the cassette. The accessing may include accessing identifying information and/or use information associated with the cassette.

In another aspect of the present disclosure the method further includes, upon the receipt of the cassette within the cassette bay, detecting insertion of the cassette to the operational position. The locking of the cassette within the cassette bay in the operational position, in such aspects, is performed in response to the detection of insertion of the cassette to the operational position.

Another surgical fluid management system provided in accordance with the present disclosure includes a console defining a cassette bay and including a sensor disposed adjacent the cassette bay, and a cassette, including a fluid line extending therethrough, and configured for insertion into the cassette bay of the console. The sensor is configured to detect a position of the cassette relative to the cassette bay. The console is configured to selectively lock or unlock the cassette within the cassette bay based upon the detected position of the cassette.

In an aspect of the present disclosure, the cassette is configured for insertion into the cassette bay, in an insertion direction, to an operational position. In such aspects, the console may be configured to lock the cassette within the cassette bay when the detected position of the cassette is the operational position.

In another aspect of the present disclosure, the cassette is further configured to move from the operational position, farther in the insertion direction, to a release position. In such aspects, the console may be configured to unlock the cassette from the cassette bay when the detected position of the cassette is the release position.

In another aspect of the present disclosure, the console further includes at least one actuator disposed adjacent the cassette bay. In such aspects, the console may be configured to move the at least one actuator between a retracted position and a home position to lock and unlock the cassette. Further, the console may be configured to move the at least one actuator, from the home position, to selectively open or close the fluid line of the cassette.

In still another aspect of the present disclosure, the sensor is a discrete position sensor configured to detect whether or not the cassette is disposed in at least one pre-determined position.

In yet another aspect of the present disclosure, the cassette includes a reflector and the sensor includes an emitter and a detector disposed adjacent one another. In such aspects, in at least one of the pre-determined positions of the cassette, the reflector may be positioned to reflect electromagnetic radiation from the emitter to the detector.

In still yet another aspect of the present disclosure, the cassette includes an extension defining an aperture and the sensor includes an emitter and a detector disposed on opposing sides of a channel. In such aspects, in at least one of the pre-determined positions of the cassette, the extension is positioned within the channel such that the aperture is aligned between the emitter and the detector to permit transmission of electromagnetic radiation from the emitter to the detector.

In an aspect of the present disclosure, the sensor is a continuous position sensor configured to detect a distance between the cassette and at least one pre-determined position.

In another aspect of the present disclosure, the sensor is an optical sensor or a sonic sensor configured to measure a Time of Flight (ToF) associated with a distance between the sensor and the cassette to detect the distance.

In another aspect of the present disclosure, the console further includes cassette bay electronics configured to obtain information from the cassette.

Provided in accordance with the present disclosure is still another surgical fluid management system. The system includes a console defining a cassette bay and including cassette bay electronics and a sensor disposed adjacent the cassette bay, and a cassette, including a fluid line extending therethrough, and configured for insertion into the cassette bay of the console. The cassette includes encoded information. The sensor is configured to detect the cassette received within the cassette bay. The cassette bay electronics are configured to obtain the encoded information from the cassette. The encoded information includes at least one of identifying information or use information associated with the cassette.

In an aspect of the present disclosure, the cassette bay electronics includes a wireless antenna and the cassette includes a data tag storing the encoded information. In such aspects, the wireless antenna may be configured to wirelessly access the encoded information stored on the data tag when the cassette is received within the cassette bay of the console In another aspect of the present disclosure, the cassette bay electronics includes an optical sensor assembly including a plurality of optical sensors and the cassette includes an identifier including a plurality of identifying portions. Each optical sensor is configured to detect a bit of information from a corresponding one of the identifying portions when the cassette is received within the cassette bay of the console. The plurality of bits of information constitute the encoded information.

In still another aspect of the present disclosure, the cassette bay electronics includes a current supply circuit and a voltage sensor and the cassette includes an identifier circuit. In such aspects, the current supply circuit is configured to supply a current to the identifier circuit when the cassette is received within the cassette bay of the console to enable the voltage sensor to detect a volage. The detected voltage constitutes the encoded information.

In yet another aspect of the present disclosure, the identifier circuit includes a ladder circuit. In aspects, the ladder circuit includes a plurality of ladder steps, at least one of which includes a fuse.

In still yet another aspect of the present disclosure, the sensor is a discrete position sensor configured to detect whether or not the cassette is disposed in at least one pre-determined position. Alternatively, the sensor is a continuous position sensor configured to detect a distance between the cassette and at least one pre-determined position.

In another aspect of the present disclosure, the console is configured to selectively lock or unlock the cassette within the cassette bay based upon feedback from the sensor.

BRIEF DESCRIPTION OF THE DRAWINGS

Various aspects and features of the present disclosure are described hereinbelow with reference to the drawings wherein:

FIG. 1A is a perspective view of a surgical system provided in accordance with aspects of the present disclosure including a surgical device, a console, a cassette, a fluid source, and a fluid collection canister;

FIG. 1B is an enlarged, perspective view of the area of detail indicated as "1B" in FIG. 1A;

FIGS. 8A and 8B are schematic illustrations showing yet another cassette and console configured for use with the surgical system of FIG. 1A wherein the cassette is disposed with a cassette bay of the console in partially inserted (FIG. 8A) and fully inserted (FIG. 8B) positions, respectively;

FIG. 12 is a is a schematic illustration showing still another cassette and console configured for use with the surgical system of FIG. 1A wherein the cassette is disposed within the console; and FIG. 13 is a circuit diagram illustrating communicating circuits of the cassette and console of FIG. 12.

DETAILED DESCRIPTION

Figure 1C:
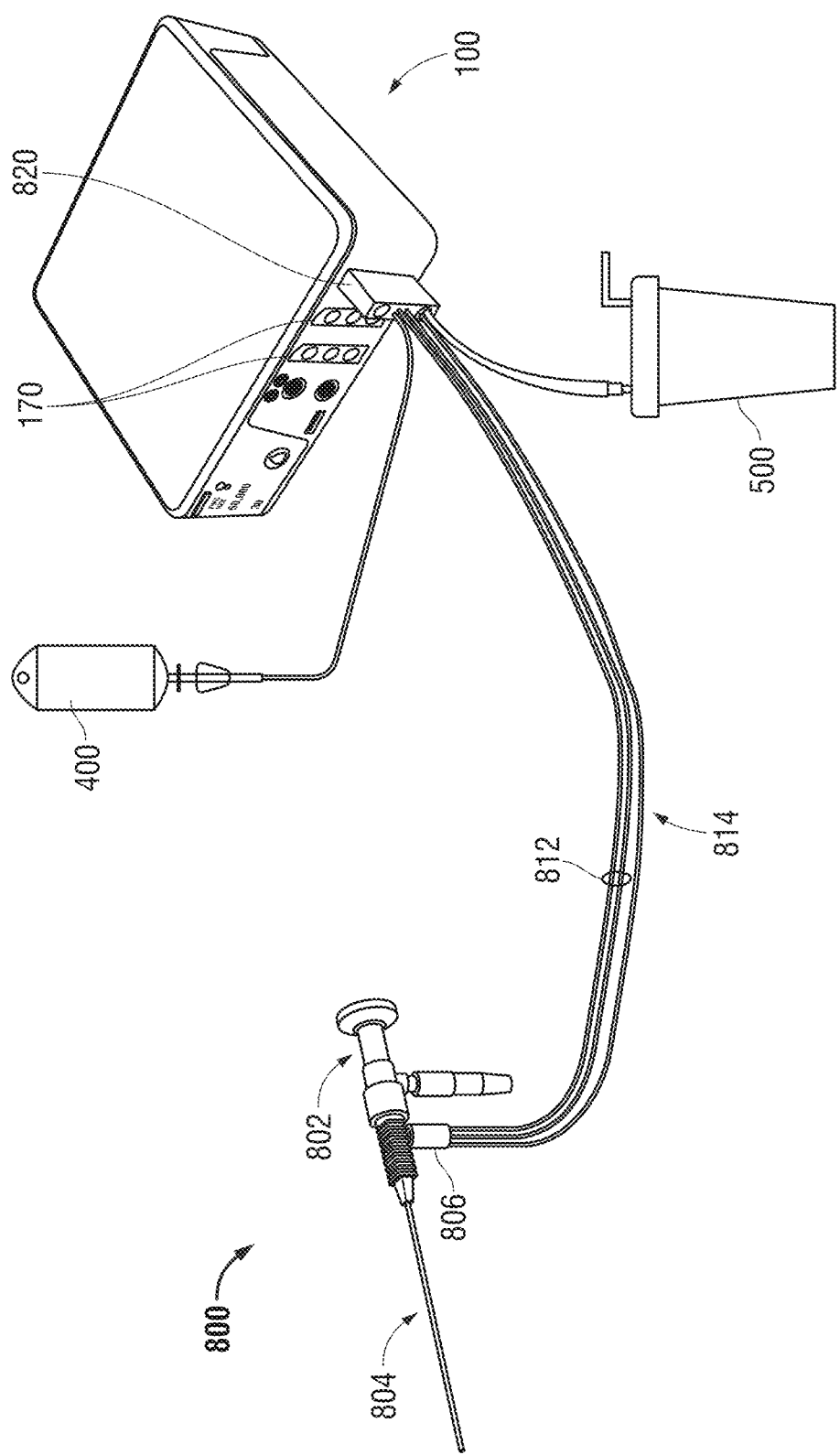
FIG. 1C is a perspective view of another surgical system provided in accordance with aspects of the present disclosure including an endoscope system and corresponding cassette configured for use with the console, fluid source, and fluid collection canister of FIG. 1A.

Referring to FIG. 1A, a surgical system 10 provided in accordance with the present disclosure generally includes: a console 100; one or more surgical devices 1200 configured to be powered, controlled, energized, supplied fluid, and/or supplied vacuum by console 100; one or more cassettes 200 each operably coupling console 100 with one of the surgical devices 1200; one or more fluid sources 400; and/or one or more fluid collection canisters 500. Although plural surgical devices 1200, cassettes 200, fluid sources 400, and/or fluid collection canisters 500 are contemplated, surgical system 10 is described below with reference to only one of each of these features for purposes of brevity and understanding. Likewise, although console 100 may include plural identical or similar features to accommodate, for example, the plurality of surgical devices 1200, cassettes 200, fluid sources 400, and/or fluid collection canisters 500, each of these features is described in the singular hereinbelow for purposes of brevity and understanding.

Console 100 includes: a housing 110; a power button 120; a graphical user interface (GUI) 130 (such as, for example, a touch screen GUI); one or more ports 140 such as, for example, power ports for powering and controlling connected powered surgical device(s) e.g., surgical device 1200, energy ports for providing surgical energy, e.g., monopolar, bipolar, microwave, ultrasonic, thermal, light, and/or other surgical energy, to connected energy device(s), additional ports 160 for connection of one or more auxiliary devices such as a foot switch; and a plurality of cassette bays 170. Console 100 further includes one or more central processing units (CPU's) and/or microcontroller units (MCU's), power generating and control hardware, surgical energy generating and control hardware, and/or any other suitable hardware and corresponding firmware/software stored thereon for operating and controlling operation of surgical devices 1200 connected thereto. In addition, console 100 includes, for each cassette bay 170, cassette bay electronics 172 (FIG. 4) that communicate with the one or more CPU's and/or MCU's, e.g., to enable power and/or data transfer therebetween. Cassette bay electronics 172 (FIG. 4) are positioned adjacent a corresponding cassette bay 170 to enable communication between console 100 and a cassette 200 received within the cassette bay 170, as detailed below.

Console 100 additionally includes an actuation mechanism 600 (FIGS. 3A-3B) operably positioned relative to a corresponding cassette bay 170 to control the various fluid paths (irrigation, vacuum, etc.) defined through cassette 200 when cassette 200 is received within cassette bay 170. One of the CPU's and/or MCU's of console 100 may also control actuation mechanism 600 (FIGS. 3A-3B) according to a particular control program selected (e.g., via graphical user interface 130), according to user-actuation of one or more controls associated with surgical device 1200, in response to sensed feedback, and/or in any other suitable manner.

Continuing with reference to FIG. 1A, surgical device 1200, as noted above, may be powered, controlled, energized, supplied fluid, and/or supplied vacuum by console 100. Surgical device 1200 may be configured as, for example and without limitation, one or more of a microdebrider, surgical drill, surgical saw, suction irrigator, tissue shaver, endoscope, sheath for an endoscope (e.g., a lens cleaning sheath), balloon or other catheter, energy device, fluid cooled device, etc.

In aspects, surgical device 1200 includes a handpiece 1210 and an end effector 1220 releasably engagable with handpiece 1210. More specifically, with respect to surgical tissue removal devices, e.g., microdebriders, surgical drills, tissue shavers, etc., handpiece 1210 may include a motor 1214 disposed therein and a drive rotor 1216 coupled to motor 1214 and configured to drive a movable (e.g., rotational, reciprocating, oscillating, or combinations thereof) component of end effector 1220 to remove tissue from a surgical site. As shown in FIG. 1B, for example, end effector 1220 may include an outer shaft 1222 and an inner shaft 1224 configured to be driven by motor 1214 via drive rotor 1216 to move relative to outer shaft 1222 to cut tissue. Further, vacuum may be applied through outer shaft 1222 and/or inner shaft 1224, e.g., through an outflow fluid line 1272 connected to collection cannister 500, to remove the cut tissue (along with fluid and debris) from the surgical site through outer shaft 1222 and/or inner shaft 1224 and to fluid collection canister 500. Surgical device 1200 may also include a power cord 1250 configured to connect surgical device 1200 to console 100 to power and control the motor, thereby controlling operation of end effector 1220.

End effector 1220 may additionally or alternatively include a sheath 1228 disposed about (in fixed or removable fashion) outer shaft 1222 and configured to deliver fluid to the surgical site. In such aspects, a proximal hub 1230 disposed at the proximal end of sheath 1228 may include a port 1232 to connect to an inflow fluid line 1234 (e.g., tube) to enable fluid to be pumped through sheath 1228 and into the surgical site. Alternatively, port 1232 may enable connection of a vacuum line such that sheath 1228 may be used for withdrawing fluid from the surgical site. Other suitable configurations of surgical device 1200 for treating tissue and/or of fluid supply/removal associated with surgical device 1200 are also contemplated.

Referring back to FIG. 1A, fluid source 400, e.g., an IV fluid bag, is fluidly coupled to one or more fluid flow paths defined within cassette 200, e.g., via a fluid line 402 connected to one of one or more inflow ports 210*a* (FIGS. 2A-2C) of cassette 200. Cassette 200 further includes one or more outflow ports 210*b* (FIGS. 2A-2C) to enable fluid line 1234 to connect the outflow of cassette 200 to port 1232 of proximal hub 1230 of end effector 1220 of surgical device 1200 to enable the supply of fluid to (or withdrawal of fluid from) sheath 1228. Cassette 200, when operably engaged within cassette bay 170 of console 100, enables the pumping of fluid from fluid source 400 to end effector 1220 of surgical device 1200, as detailed below.

Fluid collection canister 500, in aspects where provided, is fluidly coupled to an outflow port 1270 of surgical device 1200 via an outflow fluid line 1272 and, in aspects, is further coupled to a vacuum source, e.g., via cassette 200, to facilitate the withdrawal of fluid (and tissue, debris, etc.) from the surgical site, through surgical device 1200, and into fluid collection canister 500.

Referring to FIG. 1C, in accordance with the present disclosure, another surgical device and corresponding cassette configured for use with console 100, fluid source 400, and fluid collection canister 500 are shown. The surgical device is in the form of an endoscope system 800 including an endoscope 802 and an endoscope sheath 804 coupled to the endoscope 802. A connector 806 enables connection of multiple irrigations lines 812 (e.g., for irrigation into a surgical site and endoscope lens cleaning) as well as a suction line 814 (e.g., connected to a vacuum source for fluid removal from a surgical site) to endoscope sheath 804. Lines 812, 814 are connected to an endoscope sheath cassette 820 (including any of the aspects of the cassettes detailed herein) that operably couples to console 100 to enable the control of irrigation and/or suction to/from the surgical site via endoscope system 800. Although the present disclosure is detailed herein with respect to surgical device 1200 and cassette 200 (see FIG. 1A), the aspects and features detailed herein are similarly contemplated for use with endoscope system 800 and cassette 820 and/or any other suitable surgical device and corresponding cassette configured for use with console 100.

Figure 2A:
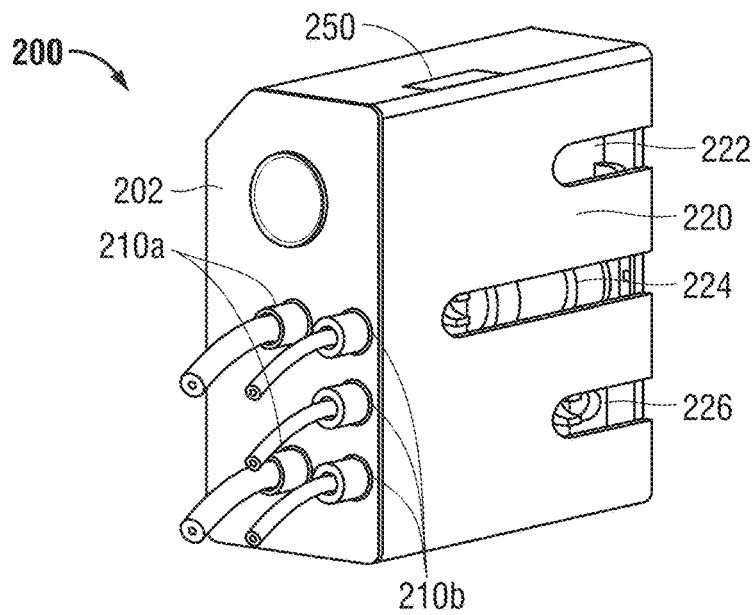
FIG. 2A is a perspective view of the cassette of the surgical system of FIG. 1A.
Figure 2B:
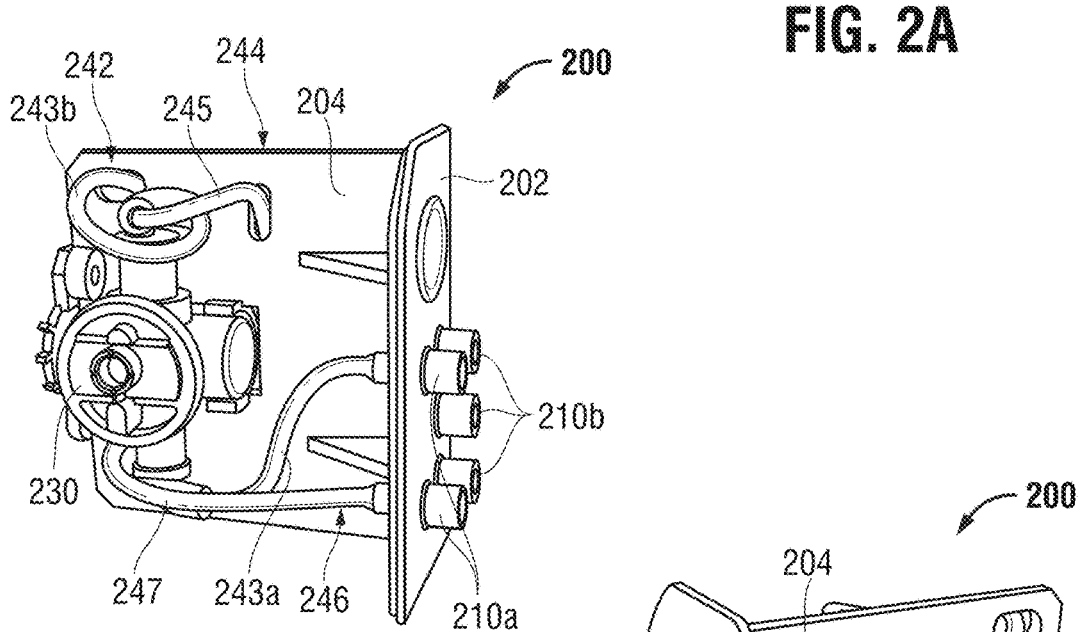
FIGS. 2B and 2C are opposing side, perspective views of the cassette of FIG. 2A with an outer housing thereof removed to illustrate internal components and features.
Figure 2C:
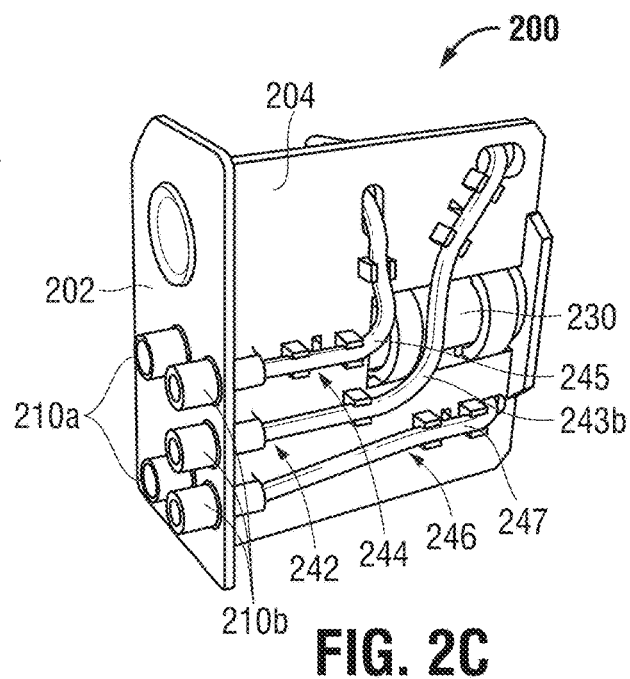

Turning to FIGS. 2A-2C, cassette 200, as noted above, is receivable within cassette bay 170 of console 100 (FIG. 1A) to operably couple the fluid flow paths defined therethrough with a corresponding actuation mechanism 600 (FIGS. 3A-3B) of console 100 (FIG. 1A) to enable control of the various fluid flow paths, e.g., to close, open, and/or control fluid flow along the various fluid flow paths. Cassette 200 includes a plurality of external tubing ports 210*a*, 210*b* to enable connection of suitable tubing to fluidly couple cassette 200 with one or more fluid flow paths associated with surgical device 1200, fluid source 400, and/or fluid collection canister 500.

Cassette 200, more specifically, includes a face plate 202 supported on a chassis 204 and defining the plurality of external tubing ports 210*a*, 210*b*, e.g., a plurality of input tubing ports 210*a* and a plurality of output tubing ports 210*b*, that enable connection of cassette 200 with fluid source 400 (FIG. 1A), surgical device 1200 (FIG. 1A), and/or fluid collection canister 500 (FIG. 1A). Cassette 200 further includes an outer housing 220 that cooperates with face plate 202 to enclose the internal components and features of cassette 200. Outer housing 220 defines a plurality of side openings 222, 224, 226 to enable console 100 (FIG. 1A) to selectively open, close, and/or otherwise control the fluid flow paths defined through cassette 200, as detailed below. Outer housing 220 also defines one or more rear receptacles (not explicitly shown) configured to enable operable coupling of a pump drive rotor (not explicitly shown) of console 100 (FIG. 1A) with pump 230 of cassette 200 to drive pump 230 of cassette 200. Cassette 200 also includes a data tag 250 to enable communication between cassette 200 and console 100 (FIG. 1) when cassette 200 is positioned within one of the cassette bays 170 of console (FIG. 1), as detailed below.

In aspects, cassette 200 defines three fluid flow paths 242, 244, 246 with two of the fluid flow paths 242, 244 configured as fluid inflow paths and the third fluid flow path 246 configured as a fluid outflow path. However, greater than three fluid flow paths and/or various different combinations of inflow and/or outflow paths are also contemplated. First fluid inflow path 242 includes tubing 243*a* connecting one of the input tubing ports 210*a* to pump 230 and tubing 243*b* connecting a first output of pump 230 with one of the output tubing ports 210*b*. Second fluid inflow path 244 shares tubing 243*a* with first inflow path 244 and includes tubing 245 that connects a second output of pump 230 with another one of the output tubing ports 210*b*. Fluid source 400 (FIG. 1A) can be connected to the input tubing port 210*a* to thus supply fluid for selective pumping along flow paths 242, 244 and out the corresponding output tubing port 210*b*. However, in other aspects, flow paths 242, 244 need not share tubing or a single fluid source 400 (FIG. 1A). Surgical device 1200 (FIG. 1A) and, more specifically, one or more fluid flow paths thereof can be connected to the output tubing port(s) 210b to enable the supply of fluid thereto for irrigation and lavage, respectively.

Fluid outflow path 246 includes tubing 247 connecting another one of the input tubing ports 210a to another one of the output tubing ports 210b such that a vacuum source (not explicitly shown) can be connected to the input tubing port 210a and an outflow fluid path of surgical device 1200 (FIG. 1A) can be connected to one of the output tubing ports 210b (by way of fluid collection canister 500 (FIG. 1A)) to provide surgical device 1200 (FIG. 1A) with suction capabilities. Other suitable fluid connections, flow paths, and pump configurations for fluid supply and/or return are also contemplated.

Continuing with reference to FIGS. 2A-2C, side openings 222, 224, 226 of outer housing 220 provide access to tubing 243b, 245, 247 to enable actuation mechanism 600 (FIGS. 3A-3B) to selectively leave open, fully close (e.g., fully pinch), or partially close (e.g., partially pinch) the internal lumens defined through tubing 243b, 245, 247, thereby selectively controlling irrigation, lavage, and/or suction through surgical device 1200 (FIG. 1A).

Figure 3A:
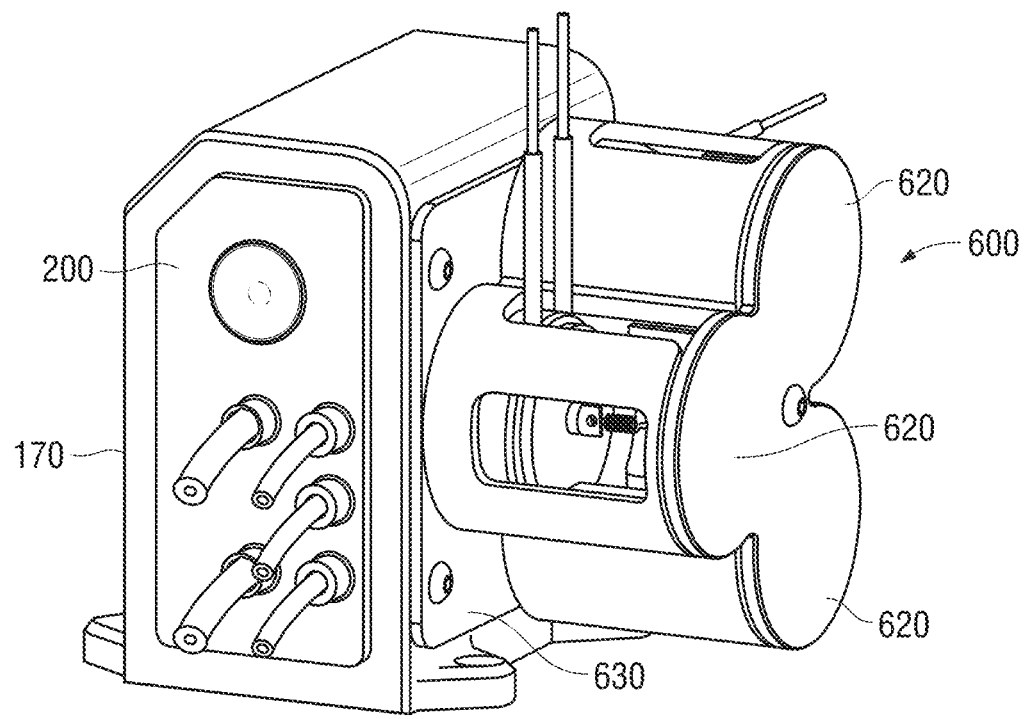
FIG. 3A is a perspective view of the cassette of FIG. 2A operably positioned within a cassette bay of the console of FIG. 1A and relative to an actuation mechanism of the console for selectively managing the various fluid flow paths (e.g., irrigation and vacuum clow paths) through the cassette.
Figure 3B:
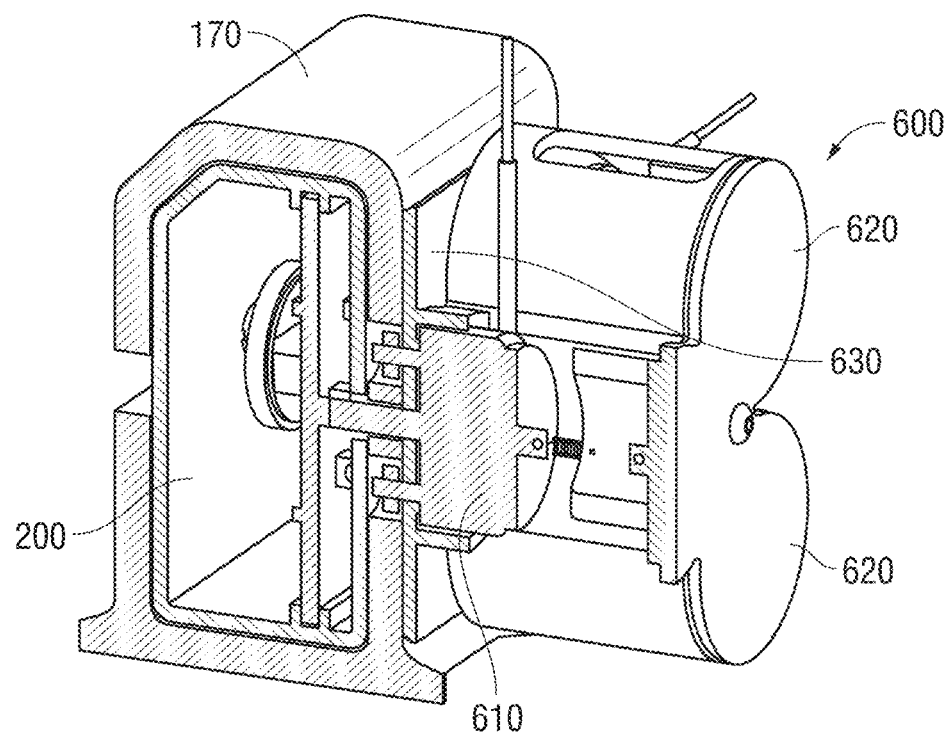
FIG. 3B is a perspective, transverse cross-sectional view of the cassette of FIG. 2A operably positioned within the cassette bay of the console of FIG. 1A and relative to the actuation mechanism of the console.

With reference to FIGS. 3A and 3B, in conjunction with FIGS. 2A-2C, actuation mechanism 600 of console 100 (FIG. 1A) includes a plurality of actuators 610, e.g., three actuators 610, and a plurality of drivers 620, e.g., three drivers 620, to selectively and independently drive the actuators 610. Actuation mechanism 600 further includes a support 630 mounted on cassette bay 170 and operably retaining actuators 610 and drivers 620 in position relative thereto. In aspects, actuators 610 may be plungers selectively deployable into and retractable from cassette bay 170. In such aspects, drivers 620 may be solenoids configured to selectively deploy and retract (or allow for spring-biased retraction of) actuators 610.

With cassette 200 disposed within cassette bay 170 in an operational position, each side opening 222, 224, 226 of outer housing 220 of cassette 200 is aligned with one of the actuators 610 of actuation mechanism 600. In this manner, each actuator 610 of actuation mechanism 600 is aligned with tubing 243b, 245, 247 of one of fluid flow paths 242, 244, 246 of cassette 200, respectively. Thus, drivers 620 can be controlled to selectively deploy or retract the corresponding actuators 610 to thereby selectively leave open, fully close, or partially close the internal lumens defined through tubing 243b, 245, 247 and, thus, selectively control irrigation, lavage, and/or suction through surgical device 1200 (FIG. 1A). With respect to fluid inflow paths 242, 244, this configuration enables independent control of fluid inflow paths 242, 244 using a single pump 230 (driven by the pump rotor (not shown) of console 100 (FIG. 1A)). For example, with pump 230 activated, either, both, or neither of irrigation and lavage can be provided. Likewise, suction can be controlled at console 100 (FIG. 1A) via the appropriate actuator 610 selectively leaving open, fully closing, or partially closing the internal lumen defined through tubing 247.

Prior to insertion of cassette 200 into cassette bay 170, or where cassette 200 is at least partially disposed within cassette bay 170 but not in the operational position within cassette bay 170, actuators 610 are disposed in a retracted position wherein actuators 610 do not protrude into cassette bay 170 or protrude minimally into cassette bay 170 so as to enable the insertion and withdrawal of cassette 200 into and from cassette bay 170. Upon cassette 200 achieving the operational position within cassette bay 170, actuators 610 are advanced partially through side openings 222, 224, 226 of outer housing 220 of cassette 200 to home positions to thereby lock cassette 200 in the operational position within cassette bay 170. As such, in use, within cassette 200 locked in the operational position wherein actuators 610 are aligned with tubing 243b, 245, 247 in the home positions, actuators 610 may be advanced from the home positions thereof and/or retracted back to the home positions thereof to fully close, partially close, or open the corresponding tubing 243b, 245, 247 as detailed above. Of course, when it is desired to remove cassette 200 from cassette bay 170, actuators 610 are first required to be returned from their home positions to their retracted positions, thereby releasing cassette 200 and enabling subsequent removal of cassette 200 from cassette bay 170.

In other aspects, another lock mechanism (as an alternative or in addition to actuators 610) may be utilized to lock cassette 200 in the operational position within cassette bay 170. Regardless of whether actuators 610 and/or another lock mechanism is utilized, ensuring that cassette 200 is disposed in the operational position within cassette bay 170 prior to deploying actuators 610 to the home positions and ensuring that actuators 610 are returned to the retracted positions prior to removal of cassette 200 from cassette bay 170 inhibits damaging console 100 (FIG. 1A) and cassette 200.

As detailed below, console 100 (FIG. 1A) includes a sensor 174 (FIG. 4) associated with each cassette bay 170 to enable determination of when cassette 200 is inserted into cassette bay 170 and disposed in the operational position within cassette bay 170 (thereby signaling that it is safe to deploy actuators 610 to the home position and lock cassette 200 in the operational position within cassette bay 170) and also to enable determination of attempted withdrawal of cassette 200 from cassette bay 170 (such that actuators 610 can be moved to the retracted positions to unlock cassette 200 and enable withdrawal of cassette 200 from cassette bay 170).

Figure 4:
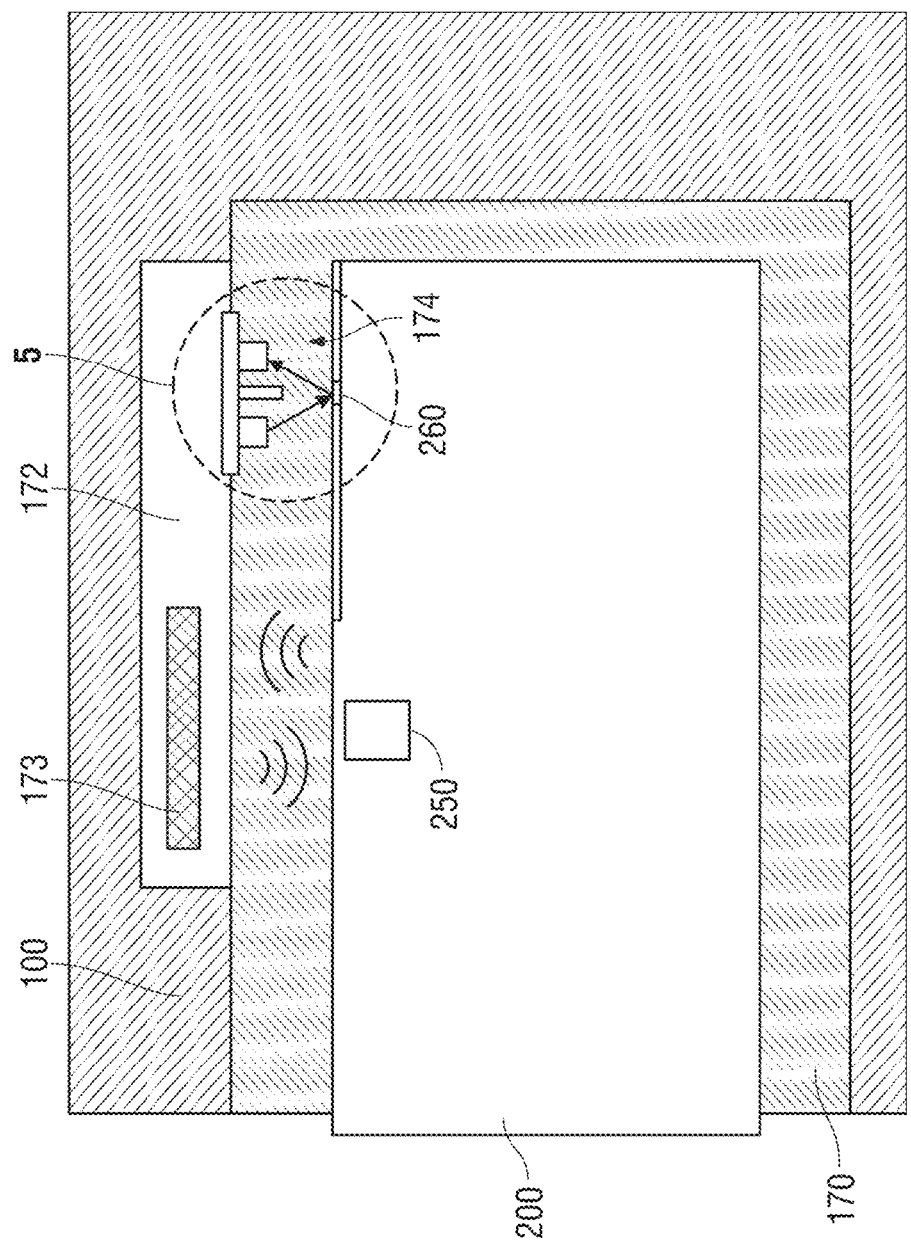
FIG. 4 is a schematic illustration showing the cassette of FIG. 2A disposed with the cassette bay of the console of FIG. 1A.

Turning to FIG. 4, in conjunction with FIGS. 2A-3B, as noted above, cassette 200 includes a data tag 250 to enable communication between cassette 200 and console 100 (FIG. 1A) when cassette 200 is positioned within one of the cassette bays 170 of console (FIG. 1A), as detailed below. Cassette 200 may further include a reflector 260 disposed thereon. Console 100, as also noted above, includes cassette bay electronics 172 and a sensor 174 associated with and operably positioned relative to each cassette bay 170.

Data tag 250 of cassette 200 may be passive or active and may include, for example, an NFC tag, an RFID tag and/or any other suitable storage medium storing readable and/or read/writable data. Cassette bay electronics 172 of console 100 may include an antenna 173, e.g., an NFC antenna, an RFID antenna, or other suitable antenna, capable of wirelessly accessing or communicating with data tag 250, e.g., via RFID communication or NFC. In other aspects, mating contacts associated with cassette 200 and cassette bay 170 of console 100 may be provided to enable cassette bay electronics 172 to access or communicate with data tag 250 via a wired connection.

Regardless of the particular manner of communication, cassette bay electronics 172 may be configured to access and/or communicate with data tag 250 to obtain identifying information associated with cassette 200 such as, for example, a unique ID, device type, lot number, manufacture date, etc. This identifying information may be used to configure console 100 for use with cassette 200, e.g., based upon the features and/or settings associated with that cassette 200. Identifying information may additionally or alternatively be utilized to authenticate cassette 200 (e.g., to prevent counterfeit or unverified cassettes 200 from being used); and to read/write use information to/from cassette 200 (e.g., a use count, that the cassette has been used, etc.). In aspects, cassette 200 is configured as a single use (or limited use) disposable component such that console 100 activates a used flag within data tag 250 of cassette 200 (e.g., upon insertion, after activation, upon withdrawal, or in any other suitable manner) and inhibits use of an inserted cassette 200 that already has its used flag activated. With respect to multi-use cassettes 200, console 100 may increment a use counter within data tag 250 (e.g., upon insertion, after activation, upon withdrawal, or in any other suitable manner) and inhibit use of an inserted cassette 200 that has already reached a use threshold.

Figure 5A:
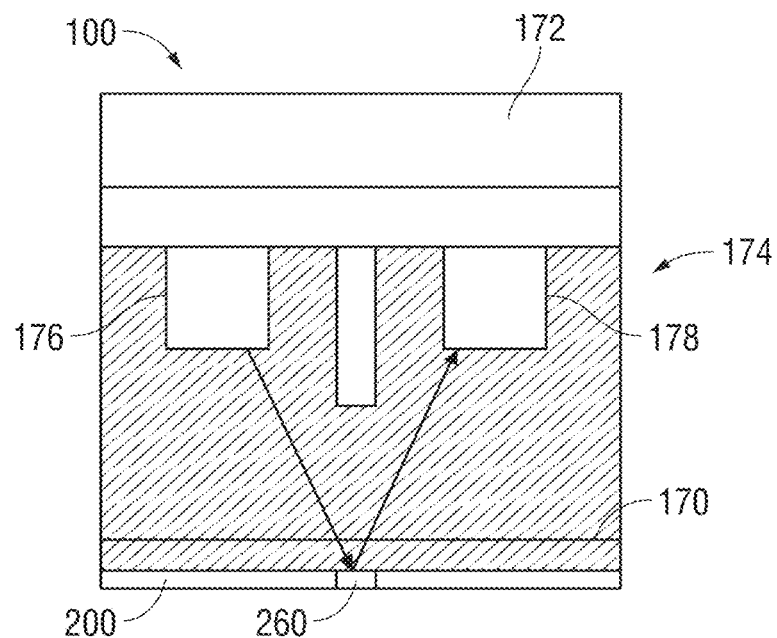
FIGS. 5A and 5B are enlarged, schematic drawings of the area of detail indicated as "5" in FIG. 4, wherein the cassette of FIG. 2A is disposed within the cassette bay of the console of FIG. 1A in operational and release positions, respectively.
Figure 5B:
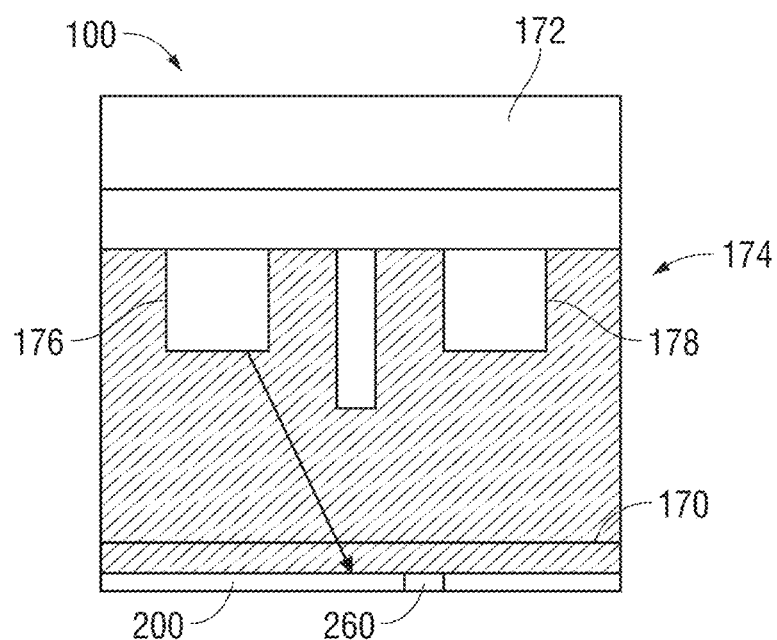

Referring also to FIGS. 5A and 5B, sensor 174 of console 100 enables determination of when cassette 200 is disposed in the operational position within cassette bay 170. Sensor 174 is configured such that, when cassette 200 is determined to be disposed in the operational position, actuators 610 can be safely advanced through side openings 222, 224, 226 of outer housing 220 of cassette 200 to the home positions thereof to thereby lock cassette 200 in the operational position within cassette bay 170. A suitable sensor 174 for this purpose may include an optical sensor. More specifically, sensor 174 may include an emitter 176 configured to output electromagnetic radiation (e.g., visible, infrared, or other suitable wavelength of light or other electromagnetic radiation) and a detector 178 configured to detect the electromagnetic radiation (e.g., and generate a voltage based thereon). Emitter 176 and detector 178 are positioned adjacent to one another such that the electromagnetic radiation emitted from emitter 176 is required to be reflected to the detector 178 to enable detection. Reflector 260 of cassette 200 is positioned on cassette 200 such that the electromagnetic radiation emitted from emitter 176 is reflected off of reflector 260 towards detector 178 only when cassette 200 is disposed in the operational position within cassette bay 170 (see FIG. 5A). Even a relatively minor deviation of cassette 200 from the operational position within cassette bay 170 (see FIG. 5B) inhibits reflection of the electromagnetic radiation to the detector 178.

With reference to FIGS. 1A and 2A-5A, in use, a processor associated with cassette bay electronics 172 (or one of the CPU's and/or MCU's of console 100) may monitor the voltage at detector 178 to determine whether the electromagnetic radiation emitted from emitter 176 has been detected and, thus, to determine whether a cassette 200 is disposed in the operational position within cassette bay 170. Since communication (e.g., via NFC or RFID communication) between cassette bay electronics 172 and data tag 250 is less sensitive to alignment of cassette 200 within cassette bay 170, emitter 176 may only be activated and detector 178 monitored once cassette bay electronics 172 determine that a cassette 200 is present, e.g., being inserted into cassette bay 170. Alternatively, emitter 176 may continuously output the electromagnetic radiation and detector 178 may be continuously monitored.

Once detector 178 detects the electromagnetic radiation emitted from emitter 176 and, based thereon, the processor associated with cassette bay electronics 172 (or one of the CPU's and/or MCU's of console 100) determined that cassette 200 is disposed in the operational position within cassette bay 170, actuators 610 may be deployed from their retracted positions to their home positions to lock cassette 200 within cassette bay 170 in the operational position. Alternatively or additionally, another lock mechanism or other operational component may be activated to lock cassette 200 within cassette bay 170 in the operational position (for example, one or more of the actuators may be configured as a rotary pump driver or other suitable actuator configured to operate cassette 200 under the control of console 100). Thereafter, console 100 may operate cassette 200 to facilitate performing a surgical procedure, as detailed above.

In aspects, console 100 may deactivate emitter 176 and/or not monitor detector 178 during active use of surgical device 1200 (e.g., as determined by console 100 actively outputting power and/or control signals to surgical device 1200) and/or cassette 200 (e.g., as determined by console 100 driving pump 230 and/or one or more of actuators 610 from their home positions). In this manner, relatively minor shifts in the positioning of cassette 200 during active use will not result in retraction of actuators 610. In other aspects, emitter 176 and detector 178 remain active and monitored throughout use. In such aspects, retraction of actuators 610 may not automatically occur in response to loss of detection of the electromagnetic radiation at detector 178 during active use. Rather, a warning may be provided (e.g., an audible tone and/or visual output on GUI 130), active use may be halted, and/or a countdown timer to retraction of actuators 610 and/or stopping of active use may be initiated.

With additional reference to FIG. 5B, when it is desired to unlock and withdraw cassette 200 from cassette bay 170 (e.g., when surgical instrument 1200 and/or cassette 200 are not in active use), cassette 200 is manually urged farther into cassette bay 170 to a release position. Cassette bay 170 may define sufficient clearance to enable the advancement of cassette 200 farther into cassette bay 170 beyond the operational position and to the release position. This clearance is sufficiently large such that, in the release position of cassette 200, reflection of the electromagnetic radiation off reflector 260 towards detector 178 is inhibited but sufficiently small so as to inhibit potentially damaging contact between actuators 610 and outer housing 220 of cassette 200 (and/or between other components of cassette 200 and console 100). In aspects, a spring or other suitable biasing feature (not explicitly shown) is disposed between cassette 200 and a forward wall of cassette bay 170 such that the manual urging of cassette 200 farther into cassette bay 170 towards the released position is accomplished against the bias of the spring. Such a configuration facilitates ejection of cassette 200 once cassette 200 is unlocked, as detailed below.

Once cassette 200 is moved from the operational position to the release position such that detector 178 no longer detects the electromagnetic radiation emitted from emitter 176, console 100 directs actuators 610 to be retracted from their home positions to the retracted positions (and/or unlocking of any other locking mechanisms or components associated with cassette 200), thereby unlocking cassette 200 and enabling withdrawal of cassette 200 from console 100. In aspects where a spring or other suitable biasing feature (not explicitly shown) is provided, the unlocking of cassette 200 enables the spring, under its bias, to at least partially eject cassette 200 from cassette bay 170, thereby facilitating manual grasping and full removal of cassette 200 from cassette bay 170.

Figure 6:
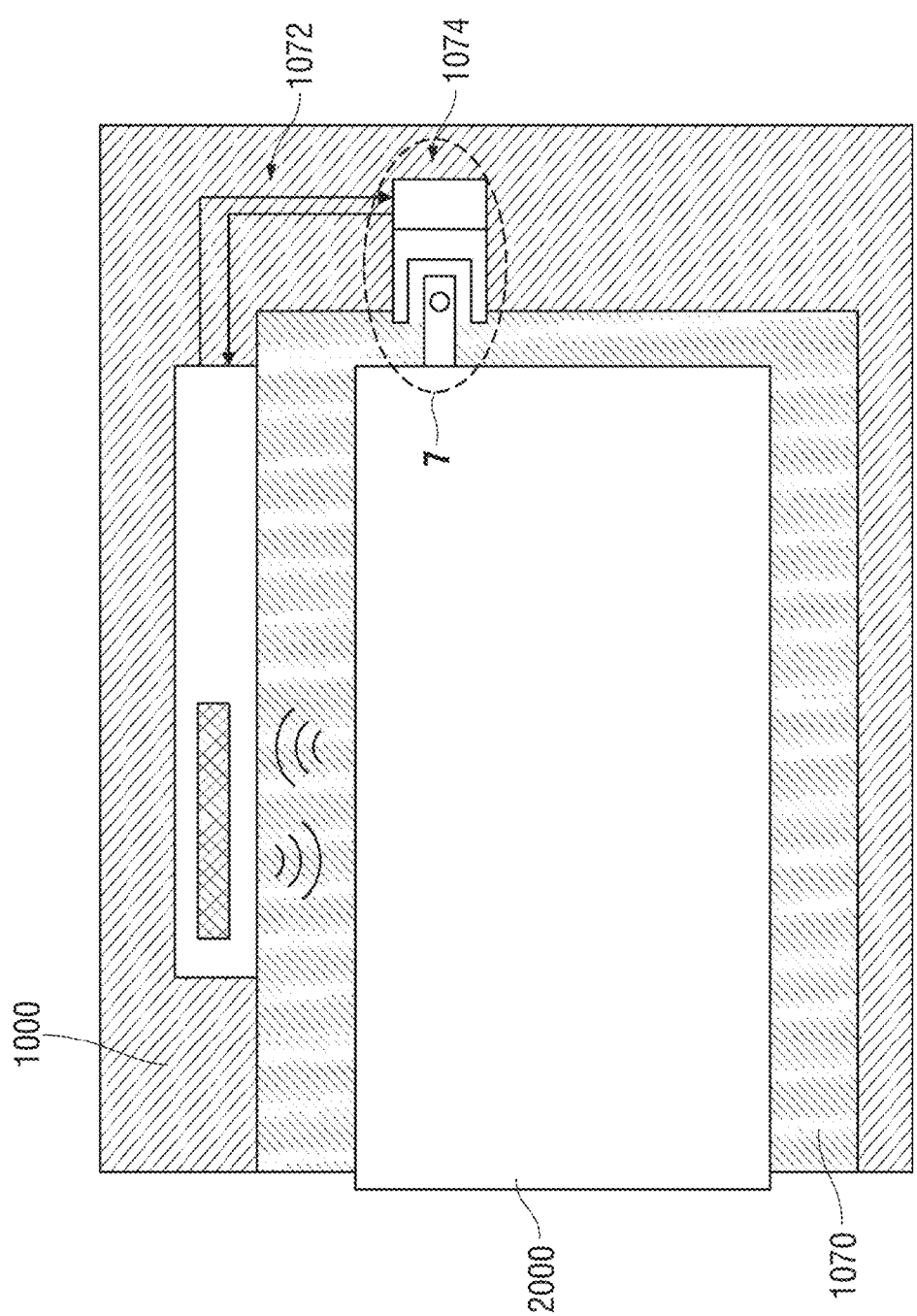
FIG. 6 is a schematic illustration showing another cassette and console configured for use with the surgical system of FIG. 1A wherein the cassette is disposed with a cassette bay of the console.
Figure 7A:
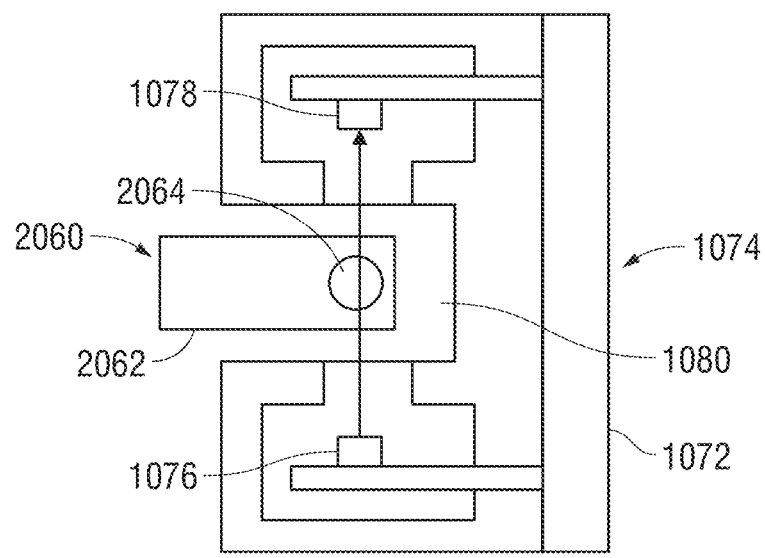
FIGS. 7A and 7B are enlarged, schematic drawings of the area of detail indicated as "7" in FIG. 6, wherein the cassette of FIG. 6 is disposed within the cassette bay of the console of FIG. 6 in operational and release positions, respectively.
Figure 7B:
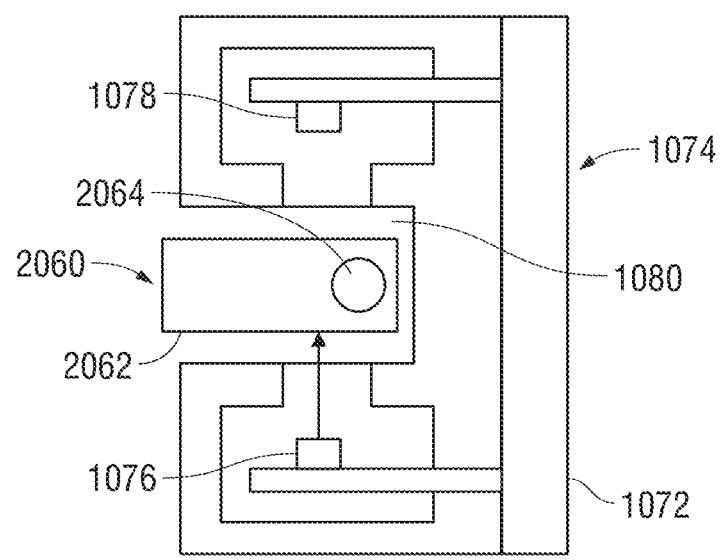

Turning to FIGS. 6-7B, another console 1000 and cassette 2000 are shown. Console 1000 and cassette 2000 are similar to console 100 and cassette 200 (FIG. 1A) detailed above and, thus, only differences are described in detail below while similarities are summarily described or omitted entirely.

Cassette 2000, rather than including a reflector, includes an extension 2060 extending from outer housing 2020. Extension 2060 defines a blocking surface 2062 and includes an aperture 2064 defined transversely through the blocking surface 2064.

Console 1000 includes cassette bay electronics 1072 operably positioned relative to cassette bay 1070. Cassette bay electronics 1072 includes a sensor 1074 which may be an optical sensor. Sensor 1074 differs from sensor 174 (FIGS. 4-5B) in that sensor 1074 including an emitter 1076 and a detector 1078 disposed on opposing sides of a receiving channel 1080. Electromagnetic radiation emitted from emitter 1076 is detectable by detector 1078 unless a blocking structure received in channel 1080 inhibits transmission of the electromagnetic radiation across channel 1080 to detector 1078. Upon insertion of cassette 2000 into cassette bay 1070, extension 2060 is received within channel 1080. With cassette 2000 disposed in the operational position within cassette bay 1070, aperture 2064 is aligned between emitter 1076 and detector 1078 to permit the transmission of electromagnetic radiation therebetween such that electromagnetic radiation emitted from emitter 1076 is detectable by detector 1078, e.g., such that detector 1078 produces a voltage in response to detection of the electromagnetic radiation. However, even a relatively minor deviation of cassette 2000 from the operational position within cassette bay 1070 misaligns aperture 2064 such that blocking surface 2062 of extension 2060 is disposed between emitter 1076 and detector 1078 to inhibit the electromagnetic radiation from reaching detector 1078.

In use, a processor associated with cassette bay electronics 1072 of console 1000 (or one of the CPU's and/or MCU's of console 1000) may monitor the voltage at detector 1078 to determine whether the electromagnetic radiation emitted from emitter 1076 has been detected and, thus, to determine whether a cassette 2000 is disposed in the operational position within cassette bay 1070. With respect to insertion of cassette 2000, the processor may look for a voltage, followed by the absence of a voltage and subsequent re-establishment of the voltage, thus indicating the initial insertion of cassette 2000 (as determined by the movement of extension 2060 into channel 1080 wherein blocking surface 2062 initially blocks the path between emitter 1076 and detector 1078) and subsequent movement of cartridge 2000 into the operational position (as determined by the re-detection of the voltage when aperture 2064 is aligned between emitter 1076 and detector 1078) (see FIG. 7A). Alternatively, in this configuration and/or the configuration of FIGS. 4-5B, insertion of cassette 2000 may be determined by communication (e.g., via NFC or RFID communication) between the cassette bay electronics 1072 and cassette 2000, e.g., the data tag thereof.

Once it is determined that cassette 2000 is disposed in the operational position within cassette bay 170, actuators or another suitable lock mechanism may be actuated to lock cassette 2000 within cassette bay 1070 in the operational position. Thereafter, console 1000 may operate cassette 2000 to facilitate performing a surgical procedure, as detailed above.

In aspects, console 1000 may deactivate emitter 1076 and/or not monitor detector 1078 during active use of surgical device 1200 (FIG. 1A) and/or cassette 2000. In this manner, relatively minor shifts in the positioning of cassette 2000 are ignored. In other aspects, emitter 1076 and detector 1078 remain active and monitored throughout use and, where loss of detection of the electromagnetic radiation at detector 1078 is determined, a warning may be provided (e.g., an audible tone and/or visual output on GUI 130), active use may be halted, and/or a countdown timer may be initiated.

When it is desired to unlock and withdraw cassette 2000 from cassette bay 1070, cassette 2000 is manually urged farther into cassette bay 1070 to a release position. Cassette bay 1070 may define sufficient clearance to enable minimal advancement of cassette 2000 farther into cassette bay 1070 beyond the operational position (and to the release position) sufficient to interrupt transmission of the electromagnetic radiation to detector 1078 but without allowing for potentially damaging contact between cassette 2000 and console 1000. In aspects, a spring or other suitable biasing feature (not explicitly shown) is disposed between cassette 2000 and a forward wall of cassette bay 1070 to provide a bias against the manual urging of cassette 2000 farther into cassette bay 1070 and to facilitate ejection of cassette 2000 similarly as detailed above.

Once cassette 2000 is moved from the operational position such that aperture 1064 is no longer aligned between emitter 1076 and detector 1078 and, thus, such that detector 1078 is no longer able to detect the electromagnetic radiation emitted from emitter 1076 (see FIG. 7B), console 1000 directs cassette 2000 to be unlocked, thereby enabling withdrawal of cassette 2000 from console 1000. In aspects where a spring or other suitable biasing feature (not explicitly shown) is provided, the unlocking of cassette 2000 enables the spring, under its bias, to at least partially eject cassette 2000 from cassette bay 1070, thereby facilitating manual grasping and full removal of cassette 2000 from cassette bay 1070.

Turning to FIGS. 8A and 8B, another console 1100 and cassette 2100 are shown. Console 1100 and cassette 2100 are similar to and may include any of the features of console 100 and cassette 200 (FIG. 1A), or any of the other consoles and cassettes detailed herein. Thus, only differences between console 1100 and cassette 2100 and console 100 and cassette 200 (FIG. 1A), respectively, are described in detail below while similarities are summarily described or omitted entirely.

Console 1100 includes a sensor 1174 associated with each cassette bay 1170 thereof to enable determination of the position of cassette 2100 as cassette 2100 is inserted into, received within, and/or removed from cassette bay 1170. More specifically, while sensors 174 (FIGS. 4-5B) and 1074 (FIGS. 6-7B) provide discrete feedback, e.g., binary or other discrete feedback, to enable determination of whether or not a cassette is disposed in the operational position (and/or one or more additional positions such as the release position), sensor 1174 provides continuous feedback to enable determination of the actual position of cassette 2100 relative to cassette bay 1170, e.g., the distance cassette 2100 is inserted into cassette bay 1170, the distance cassette 2100 extends from cassette bay 1170, and/or the distance of cassette 2100 from one or more pre-determined position(s) associated with cassette bay 1170 (for example, the operational position, the release position, etc.).

Continuing with reference to FIGS. 8A and 8B, sensor 1174 of console 1100 enables determination of the position of cassette 2100 relative to cassette bay 1170. Thus, sensor 1174 is capable of determining when cassette 2100 is disposed in the operational position such that the actuators can be safely advanced through the outer housing 2120 of cassette 2100 to the home positions thereof to thereby lock cassette 2100 in the operational position within cassette bay 1170. Further, sensor 1174, as a continuous sensor, also enables determination of the distance of cassette 2100 from the operational position (and/or other positions) such that sensor 1174, in conjunction with one or more of the CPU's and/or MCU's of console 1100 may provide a warning and/or indication to a user regarding the position of cassette 2100. For example: console 1100 may output a visual and/or audible indication that cassette 2100 needs to be inserted further into cassette bay 1170 to reach the operational position; that cassette 2100 has been inserted too far into cassette bay 1170; that cassette 2100 needs to be inserted further into cassette bay 1170 to reach the release position; etc. Sensor 1174, in conjunction with one or more of the CPU's and/or MCU's of console 1100, may also provide other feedback, e.g., visual and/or audible indication(s), such as, for example, to insert cassette 2100 more carefully, e.g., based on sensor data over time indicating a speed of insertion of cassette 2100 above a threshold.

Sensor 1174 may be any suitable sensor for providing continuous position feedback. Sensor 1174, more specifically, may be configured as a sonic sensor configured to transmit a sound wave at a defined frequency and to determine a Time-of-Flight (ToF) upon receipt of the sound wave (after reflection off cassette 2100 and back to sensor 1174). In aspects, the sonic sensor is an ultrasonic sensor configured to transmit the sound wave at a defined ultrasonic frequency. Based upon the ToF, a distance of cassette 2100 from sensor 1174 can be determined and, based on that determined distance, the distance of cassette 2100 relative to cassette bay 1170 and/or any other position(s) can be determined. In aspects, in order to facilitate ToF determination, sensor 1174 is positioned to transmit the sound wave in the insertion/removal direction of cassette 2100 to/from cassette bay 1170. Thus, as illustrated in FIGS. 8A and 8B, sensor 1174 may be positioned at or beyond a rear wall of cassette bay 1170.

Figure 9:
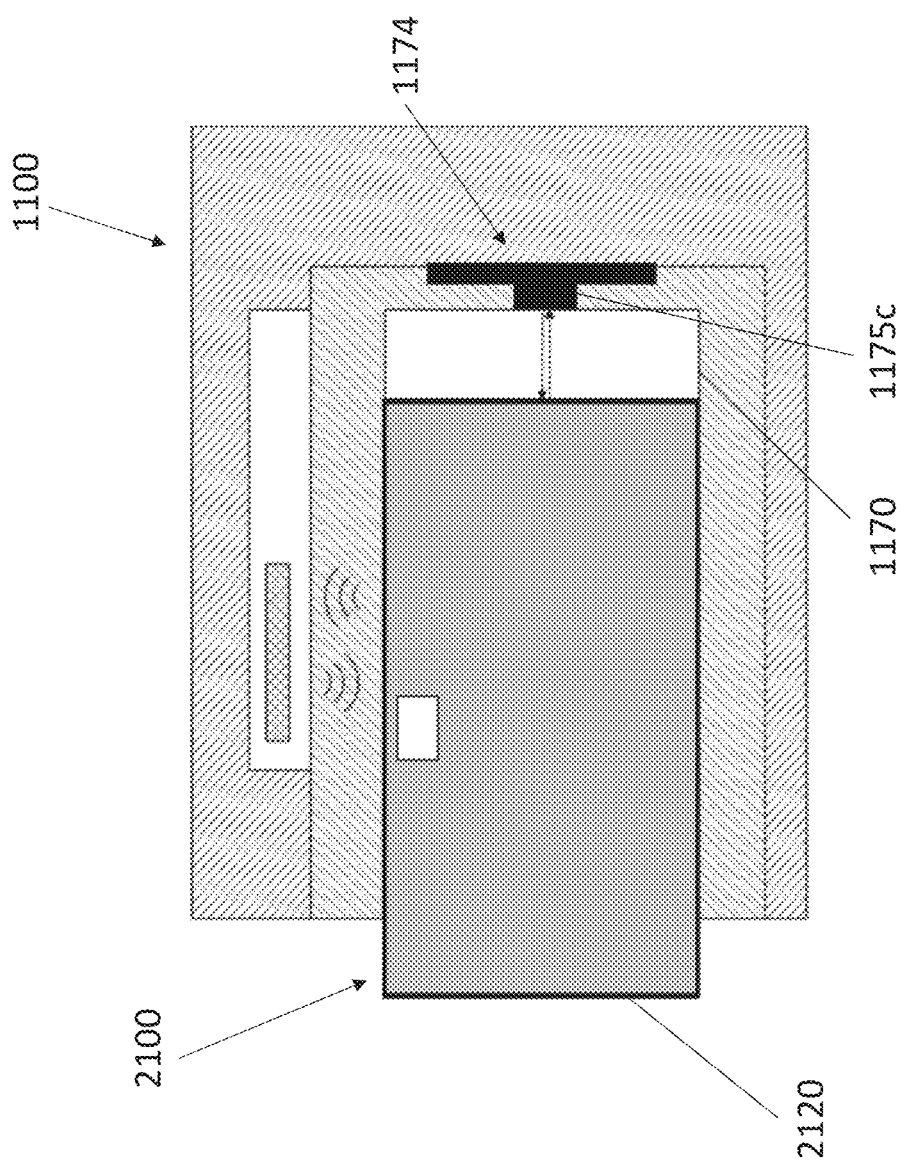
FIG. 9 is a schematic illustration showing still another cassette and console configured for use with the surgical system of FIG. 1A wherein the cassette is disposed with a cassette bay of the console in a partially inserted position.

In order to facilitate the above-detailed transmission and reception of the sound wave, as shown in FIGS. 8A and 8B, sensor 1174 may include a separate transmitter 1175*a* and receiver 1175*b*. Alternatively, as shown in FIG. 9, sensor 1174 may include a transceiver 1175*c* configured to both transmit and receive the sound wave. In either configuration, rather than transmitting and receiving a sound wave, sensor 1174 may be configured as an optical sensor configured to emit a light wave at a defined wavelength, to receive the light wave after reflection off cassette 2100 and back to sensor 1174, and to determine a ToF based thereon. Other suitable continuous position sensors are also contemplated. In addition to the above-detailed continuous position determination provided by sensor 1174, sensor 1174 also provides the functionality of any or all of the above-detailed sensors, e.g., based upon detecting movement of cassette 2100 to and/or from the operational position, the release position, etc.

Figure 11:
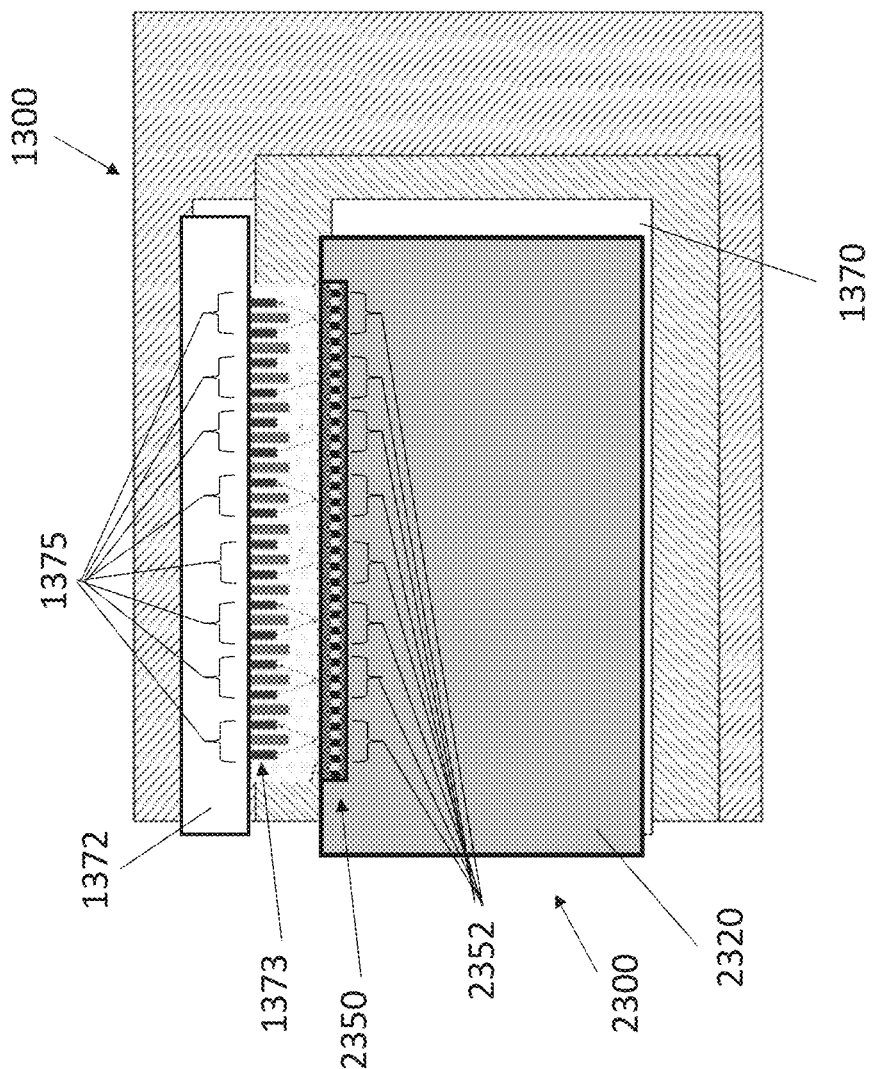
FIG. 11 is a schematic illustration showing the cassette of FIG. 10 disposed within a console configured for use with the surgical system of FIG. 1A.
Figure 10:
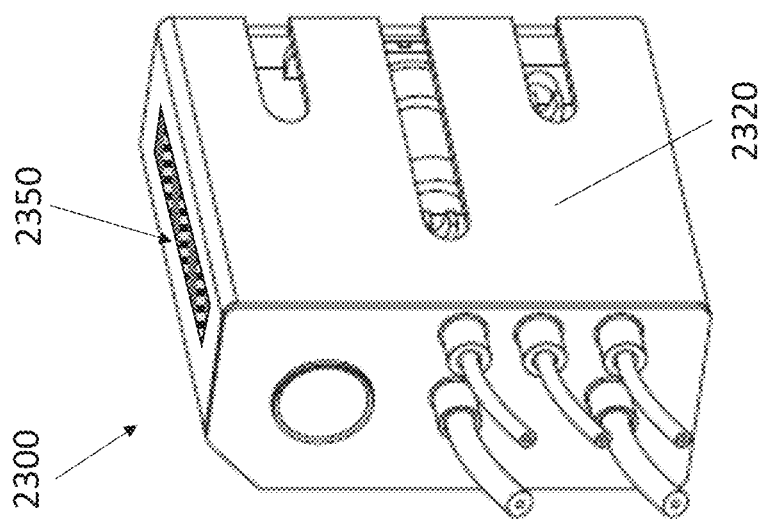
FIG. 10 is a perspective view of another cassette configured for use with the surgical system of FIG. 1A.

Turning to FIGS. 10 and 11, yet another console 1300 and cassette 2300 are shown. Console 1300 and cassette 2300 are similar to and may include any of the features of any or all of the consoles and cassettes detailed herein; thus, only differences between console 1300 and cassette 2300 and console 100 and cassette 200 (FIG. 1A), respectively, are described in detail below while similarities are summarily described or omitted entirely.

Cassette 2300 includes an identifier 2350 disposed on an exterior surface of outer housing 2320 of cassette 2300. Identifier 2350 may be printed onto outer housing 2320, may be a sticker adhered to outer housing 2320, or may be disposed on outer housing 2320 in any other suitable manner. Although illustrated in FIGS. 10 and 11 and disposed on a top surface of cassette 2300, identifier 2350 may be disposed at any suitable location on cassette 2300 to enable console 1300 to read identifier 2350 upon insertion of cassette 2300 into console 1300.

Identifier 2350 includes an array of identifying sections 2352 each including one or more optical indicators in the form of one or more of shapes, symbols, etc. of a particular color (e.g., black or white), reflectance (e.g., reflective or not reflective), etc. Each of the one or more optical indicators of each identifying section 2352 encodes information capable of being read by console 1300. By way of example, identifier 2350 may include an array of eight (8) identifying sections 2352 each encoding a bit of information, e.g., configured to be read as 1 or 0. Thus, up to 256 unique arrays for identifying different cassettes 2300 and/or conveying information relating thereto are realized, all with an inexpensive and readily manufacturable identifier 2350 without any power requirements.

Continuing with reference to FIGS. 10 and 11, console 1300 includes cassette bay electronics 1372, e.g., a cassette bay circuit board, including an optical sensor assembly 1373. Optical sensor assembly 1373 includes an array of optical sensors 1375. The number of optical sensors 1375 may correspond to the number of identifying sections 2352 of identifier 2350 of cassette 2300. Each optical sensor 1375 includes an optical transmitter and optical receiver (or an optical transceiver) that emits light at a defined wavelength and detects the light reflected off the corresponding identifying section 2352 of identifier 2350, respectively. As noted above, each identifying section 2352 may encode a bit of information (or more information) and, thus, each optical sensor 1375 may be configured to produce a binary response, e.g., a 1 or 0, based on the reflected light detected (or lack thereof).

In aspects, each identifying section 2352 may encode additional information such as, for example, more than two different outputs and, correspondingly in such aspects, each optical sensor 1375 may be configured to detect more than two different responses based on the reflected light and/or multiple optical sensors 1375 may be allocated to each of such identifying sections 2353. While such a configuration increases the amount of information capable of being conveyed via identifier 2350 and read by optical sensor assembly 1373 and, thus, is useful in certain aspects (e.g., where conveyance of greater amounts of information is desired), such a configuration also increases the complexity and, thus, cost of optical sensor assembly 1373 and, therefore, of console 1300.

Upon receipt of cassette 2300 within cassette bay 1370 of console 1300 in the operational position, identifier 2350 of cassette 2300 is disposed in alignment with optical sensor assembly 1373 and, more specifically, each identifying section 2352 of identifier 2350 is aligned with a corresponding optical sensor 1375 of optical sensor assembly 1373. Thus, once cassette 2300 is inserted to the operational position within cassette bay 1370, e.g., as determined by any of the presence/position sensor configurations detailed herein or any other suitable presence/position sensor, cassette bay electronics 1372 of console 1300 may activate optical sensor assembly 1373 such that each optical sensor 1375 reads the information encoded on the corresponding identifying section 2352.

With respect to the information encoded on each identifying section 2352 and read by console 1300 to identify and, in aspects, determine additional information pertaining to the inserted cassette 2300, the information (e.g., 1's and 0's, where bits are utilized) may be combined to provide one cumulative piece of information. For example, in an 8-bit configuration as exemplified above, the identifier 2350 of a cassette 2300 may provide a unique sequence from the 256 possible unique sequences. Thus, for example, up to 256 different types of cassettes 2300 can be identified by console 1300. Of course, where greater or fewer bits are utilized, greater or fewer unique sequences are realized.

As an alternative to one cumulative piece of information, the information from the different identifying sections 2352 of a cassette 2300 may be divided into subsets to provide multiple difference pieces of information. For example, in an 8-bit configuration as exemplified above, a first subset of the identifying sections 2352 may include three identifying sections 2352 (e.g., three bits, where bits are utilized) and may be configured to provide any one of the eight unique sequences for the first subset; a second subset of identifying sections 2352 may include three identifying sections 2352 and may be configured to provide any one of the eight unique sequences for the second subset; and a third subset of the identifying sections 2353 may include two identifying sections 2352 and may be configured to provide any one of the four unique sequences (based on 2 bits) for the third subset. Of course, the number of subsets and number of bits (or other information) corresponding to each subset may vary, depending upon a particular purpose. The information encoded in the unique sequence for each of the various subsets may include, for example: setting information, use information, cassette type, lot number, manufacture location, etc.

Regardless of whether a single piece of information or multiple pieces of information are read by cassette bay electronics 1372 of console 1300 from identifier 2350 of cassette 2300, the read information may be used to configure console 1300 for use with that particular cassette 2300, e.g., based upon the features and/or settings associated with that cassette 2300.

Various different sensors to enable determination of the position of a cassette within a cassette bay of a console, whether via discrete position sensing (e.g., as detailed with respect to cassette 200 and console 100 (FIGS. 4-5B) and cassette 2000 and console 1000 (FIGS. 6-7B)) or continuous position sensing (e.g., as detailed with respect to cassette 2100 and console 1100 (FIGS. 8A-9)), are detailed hereinabove. Further, different configurations for identifying and/or obtaining information about the cassette received within a cassette bay of a console (e.g., via data tag 250 of cassette 200 and antenna 173 of cassette bay electronics 172 of console 100 (FIG. 4) or via identifier 2350 and optical sensor assembly 1373 of cassette bay electronics 1372 of console 1300 (FIGS. 10-11). Any combination of the above aspects may be incorporated into a cassette and console system in accordance with the present disclosure to enable both determination of the position of a cassette within a cassette bay of a console as well as identifying and/or obtaining information about the cassette received within the cassette bay of the console.

With reference to FIGS. 12 and 13, still yet another console 1400 and cassette 2400 provided in accordance with the present disclosure are shown. Console 1400 and cassette 2400 are similar to and may include any of the features of any or all of the consoles and cassettes detailed herein; thus, only the different features of console 1400 and cassette 2400 are described in detail below while similarities to any or all of the above consoles and cassettes are summarily described or omitted entirely. As detailed below, console 1400 and cassette 2400 are configured to enable communication of identifying information from cassette 2400 to console 1400 and/or enable use tracking of cassette 2400 in a passive manner, e.g., without requiring cassette 2400 to include on-board power and/or the writing of information to cassette 2400.

Console 1400 includes cassette bay electronics 1472 associated with each cassette bay 1470, e.g., a cassette bay circuit board, including a current supply circuit 1473 and a voltage sensor 1475. Current supply circuit 1473 includes a first (e.g., positive) terminal 1474a and a second (e.g., negative) terminal 1474b.

Cassette 2400 includes an identifier circuit 2450 disposed thereon or therein. Identifier circuit 2450 includes a first (e.g., positive) terminal 2452a and a second (e.g., negative) terminal 2452b and may be configured as a ladder circuit including a plurality of ladder steps arranged in parallel. Each ladder step of identifier circuit 2450 includes a fuse and defines a different resistance. For example, as illustrated in FIG. 13, identifier circuit 2450 may include: a first ladder step 2454 connected between terminals 2452a, 2452b and including a first fuse 2455 (and, in aspects, a first resistor); a second ladder step 2456 connected between terminals 2452a, 2452b and including a second fuse 2457a and a second resistor 2457b; and a third ladder step 2458 connected between terminals 2452a, 2452b and including a third fuse 2459a and a third resistor 2459b, although other configurations and/or greater or fewer ladders steps are also contemplated.

Different resistances associated with the first resistor of first ladder step 2454 (or lack of resistor associated with first ladders step 2454), second resistor 2457b of second ladder step 2456, and third resistor 2459b of third ladder step 2458 define different resistances for each ladder step 2454, 2456, 2458. More specifically, the resistance is increased for each subsequent ladder step 2454, 2456, 2458 (however, the ladder steps need not be physically arranged in resistance order). Fuses 2455, 2457a, 2459a may be electrolytic fuses configured to break to open the circuit through the corresponding ladder step 2454, 2456, 2458 upon supply of current therethrough above a current threshold. Suitable fuses include Cobalt-Chromium alloy filaments, although other suitable fuses are also contemplated. Identifier circuit 2450 may be printed on a circuit board associated with cassette 2400 or in any other suitable manner.

Upon receipt of cassette 2400 within cassette bay 1470 of console 1400 in the operational position, contacts (not explicitly shown) associated with terminals 1474a, 1474b and terminals 2452a, 2452b mate with one another to thereby establish electrical communication between the corresponding terminal pairs 1474a, 2452a and 1474b, 2452b. Thus, current supply circuit 1473 of console 1400 may be utilized to supply an electrical current from one of terminals 1474a, 1474b to identifier circuit 2450 and back to current supply circuit 1473 to complete the circuit via the other terminal 1474a, 1474b.

During an initial insertion of cassette 2400 into cassette bay 1470 of console 1400, e.g., wherein fuses 2455, 2457a, 2459a of ladder steps 2454, 2456, 2458, respectively, are intact, the current supplied to identifier circuit 2450 flows through first ladder step 2454 and back to current supply circuit 1473 since first ladder step 2454 defines the least resistance of the ladder steps 2454, 2456, 2458. Voltage sensor 1475 detects the voltage associated with the current flow through first ladder step 2454 and, based thereon, may determine a type of cassette 2400, a number of uses of cassette 2400, and/or other information associated with cassette 2400 (such as any of the identifiable information detailed above). This information may be determined based on an identifiable electrical signature (e.g., resistance) associated with the current flow through first ladder step 2454, e.g., by selecting a first resistor (where provided), first fuse 2455, and/or otherwise configuring first ladder step 2454 to provide a particular electrical signature.

Upon the initial insertion of cassette 2400 as noted above, or at any other point (e.g., upon a request to remove cassette 2400, after a pre-determined elapsed time of use or other measured amount of use, etc.), current supply 1473 may be configured to provide a current suitable to break first fuse 2455. Thus, upon a subsequent insertion of cassette 2400 (or upon a subsequent request to remove cassette 2400, a subsequent pre-determined elapsed time or other measured subsequent use, etc.) associated with a subsequent use of cassette 2400, the current supplied to identifier circuit 2450 from current supply circuit 1473 flows through second ladder step 2456 and back to current supply circuit 1473 since second ladder step 2456 defines the least resistance of the intact ladder steps (e.g., since first ladder step 2454 is an open circuit and third ladder step 2458 defines a greater resistance than second ladder step 2456). Voltage sensor 1475 detects the voltage associated with the current flow through second ladder step 2456 and, based thereon, determines the type of cassette 2400, the number of uses of cassette 2400, and/or other information associated with cassette 2400 similarly as detailed above.

Similarly as detailed above, second fuse 2457a is ultimately broken (if not broken via the initial flow of current through second ladder step 2456) such that, upon further use, the current supplied to identifier circuit 2450 from current supply circuit 1473 flows through third ladder step 2458, enabling determination of the information associated with that ladder step. The above continues for each ladder step provided. Thus, identifier circuit 2450 enables the conveyance of information to current supply circuit 1473 of console 1300 as well as the number of uses of cassette 2400 without the need to write information to cassette 2400.

In aspects, where the fuse associated with the final ladder step is broken, console 1400 recognized the open circuit and inhibits further use of cassette 2400 or otherwise provides a warning that the number of prescribed uses has been met. In other aspects, rather than the final ladder step including a fuse, the final ladder step may define a electrical signature that is detected by console 1400 as corresponding to end of useful life such that console 1400 may inhibit further use of cassette 2400 or otherwise provide a warning that the number of prescribed uses has been met.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A surgical fluid management system, comprising:
   a console defining a cassette bay and including a sensor disposed adjacent the cassette bay; and
   a cassette including a fluid line extending therethrough, the cassette configured for insertion into the cassette bay of the console,
   wherein the sensor is configured to detect a position of the cassette relative to the cassette bay, and
   wherein the console further includes an actuator movable relative to the cassette bay between a retracted position, wherein the actuator does not protrude into the cassette bay, a home position, wherein the actuator extends into the cassette bay to lock the cassette within the cassette bay, and at least one actuated position, wherein the actuator extends further into the cassette bay to at least partially close fluid flow through the fluid line, and
   wherein the console is configured move the actuator between the retracted position and the home position to selectively lock or unlock the cassette within the cassette bay based upon the detected position of the cassette.

2. The surgical fluid management system according to claim 1, wherein the cassette is configured for insertion into the cassette bay, in an insertion direction, to an operational position, and wherein the console is configured to lock the cassette within the cassette bay when the detected position of the cassette is the operational position.

3. The surgical fluid management system according to claim 1, wherein the sensor is a discrete position sensor configured to detect whether or not the cassette is disposed in at least one pre-determined position.

4. The surgical fluid management system according to claim 3, wherein the cassette includes a reflector and the sensor includes an emitter and a detector disposed adjacent one another, wherein, in at least one of the pre-determined positions of the cassette, the reflector is positioned to reflect electromagnetic radiation from the emitter to the detector.

5. The surgical fluid management system according to claim 3, wherein the cassette includes an extension defining an aperture and the sensor includes an emitter and a detector disposed on opposing sides of a channel, wherein, in at least one of the pre-determined positions of the cassette, the extension is positioned within the channel such that the aperture is aligned between the emitter and the detector to permit transmission of electromagnetic radiation from the emitter to the detector.

6. The surgical fluid management system according to claim 1, wherein the sensor is a continuous position sensor configured to detect a distance between the cassette and at least one pre-determined position.

7. The surgical fluid management system according to claim 6, wherein the sensor is an optical sensor or a sonic sensor configured to measure a Time of Flight (ToF) associated with a distance between the sensor and the cassette to detect the distance.

8. The surgical fluid management system according to claim 1, wherein the console further includes cassette bay electronics, the cassette further includes encoded information, and
   wherein the cassette bay electronics are configured to obtain the encoded information from the cassette, the encoded information including at least one of identifying information or use information associated with the cassette.

9. The surgical fluid management system according to claim 8, wherein the cassette bay electronics includes a wireless antenna and wherein the cassette includes a data tag storing the encoded information, the wireless antenna configured to wirelessly access the encoded information stored on the data tag when the cassette is received within the cassette bay of the console.

10. The surgical fluid management system according to claim 8, wherein the cassette bay electronics includes an optical sensor assembly including a plurality of optical sensors, wherein the cassette includes an identifier including a plurality of identifying portions, and wherein each optical sensor of the plurality of optical sensors is configured to detect at least one bit of information from a corresponding one of the identifying portions when the cassette is received within the cassette bay of the console, the at least one bits of information being the encoded information.

11. The surgical fluid management system according to claim 8, wherein the cassette bay electronics includes a current supply circuit and a voltage sensor, wherein the cassette includes an identifier circuit, and wherein the current supply circuit is configured to supply a current to the identifier circuit when the cassette is received within the cassette bay of the console to enable the voltage sensor to detect a voltage, the voltage being the encoded information.

* * * * *